United States Patent
Moxson et al.

(10) Patent No.: US 9,067,264 B2
(45) Date of Patent: Jun. 30, 2015

(54) METHOD OF MANUFACTURING PURE TITANIUM HYDRIDE POWDER AND ALLOYED TITANIUM HYDRIDE POWDERS BY COMBINED HYDROGEN-MAGNESIUM REDUCTION OF METAL HALIDES

(76) Inventors: Vladimir S. Moxson, Hudson, OH (US); Volodymyr A. Duz, Hudson, OH (US); Andrey G. Klevtsov, Moscow (RU); Viktor D. Sukhoplyuyev, Mayfield Heights, OH (US); Mihajlo D. Sopka, Strongsville, OH (US); Yury V. Shuvalov, St-Petersburg (RU); Mykhailo Matviychuk, Parma, OH (US)

( * ) Notice: Subject to any disclaimer, the term of this patent is extended or adjusted under 35 U.S.C. 154(b) by 410 days.

(21) Appl. No.: 13/480,436

(22) Filed: May 24, 2012

(65) Prior Publication Data

US 2013/0315773 A1 Nov. 28, 2013

(51) Int. Cl.
| | |
|---|---|
| *C01B 6/02* | (2006.01) |
| *C01B 6/24* | (2006.01) |
| *B22F 3/24* | (2006.01) |
| *B22F 9/18* | (2006.01) |
| *B22F 9/20* | (2006.01) |
| *B22F 3/10* | (2006.01) |

(52) U.S. Cl.
CPC ... *B22F 9/20* (2013.01); *B22F 9/18* (2013.01); *B22F 3/24* (2013.01); *C01B 6/02* (2013.01); *B22F 3/1007* (2013.01); *B22F 3/1017* (2013.01); *C01B 6/24* (2013.01); *B22F 2998/10* (2013.01); *B22F 2999/00* (2013.01)

(58) Field of Classification Search
None
See application file for complete search history.

(56) References Cited

U.S. PATENT DOCUMENTS

| | | | | | |
|---|---|---|---|---|---|
| 2,427,338 | A | * | 9/1947 | Alexander | 423/650 |
| 3,376,107 | A | * | 4/1968 | Oka | 423/645 |
| 5,441,695 | A | * | 8/1995 | Gladden | 419/37 |
| 5,779,761 | A | * | 7/1998 | Armstrong et al. | 75/370 |
| 6,168,644 | B1 | * | 1/2001 | Fukasawa et al. | 75/343 |
| 6,231,636 | B1 | * | 5/2001 | Froes et al. | 75/352 |
| 6,638,336 | B1 | * | 10/2003 | Drozdenko et al. | 75/359 |
| 7,914,600 | B2 | * | 3/2011 | Withers et al. | 75/366 |
| 8,007,562 | B2 | * | 8/2011 | Kasparov et al. | 75/619 |
| 8,388,727 | B2 | * | 3/2013 | Klevtsov et al. | 75/617 |
| 2013/0181162 | A1 | * | 7/2013 | Antonelli | 252/184 |

* cited by examiner

*Primary Examiner* — George Wyszomierski

(57) ABSTRACT

The invention relates to energy-saving manufacturing of purified hydrogenated titanium powders or alloying titanium hydride powders, by metallo-thermic reduction of titanium chlorides, including their hydrogenation, vacuum separation of titanium hydride sponge block from magnesium and magnesium chlorides, followed by crushing, grinding, and sintering of said block without need for any hydro-metallurgical treatment of the produced powders. Methods disclosed contain embodiments of processes for manufacturing high purity high-purity powders and their use in manufacturing near-net shape titanium and titanium-alloy articles by sintering titanium hydride and alloyed titanium hydride powders produced from combined hydrogen-magnesium reduction of titanium chlorides, halides and hydrides of other metals. Additional titanium hydride powder introduced with titanium tetrachloride beneficially affects the kinetics of magnesium-thermic reduction due to formation of additionally-emitted atomic hydrogen, which helps to reduce presence of oxides, and so cleans inter-particle interfaces of the product and enhances diffusion between all components of the powder mixture.

24 Claims, No Drawings

METHOD OF MANUFACTURING PURE TITANIUM HYDRIDE POWDER AND ALLOYED TITANIUM HYDRIDE POWDERS BY COMBINED HYDROGEN-MAGNESIUM REDUCTION OF METAL HALIDES

BACKGROUND

1. Field

The present disclosure relates to the manufacturing of hydrogenated titanium powders by the metallo-thermic reduction of titanium chlorides, including their hydrogenation, vacuum separation of the subsequently obtained titanium hydride sponge block, followed by crushing and grinding of said block. More specifically, the disclosure is directed towards the cost-cutting, time-saving, and energy-saving manufacture of purified hydrogenated titanium powders, as well as alloying titanium hydride powders, by the improved and combined hydrogen-magnesium reduction of titanium chloride $TiCl_4$, including the vacuum separation (vacuum distillation) of hydrogenated porous titanium compound from magnesium and magnesium chlorides, without the need for any hydro-metallurgical treatment of the produced powders.

The method allows for the manufacturing of titanium and titanium alloy components by low cost powder metallurgy processes, such as the room temperature consolidation of hydrogenated titanium and hydrogenated and alloyed titanium powders, by the die-pressing of near-net shaped articles, or by the direct powder rolling of flat shapes (foils, sheets, plates), or by the cold-isostatic pressing of the "chunky" components, and by other room temperature consolidation processes, followed by sintering. Sintering is performed by the invented special cycle, allowing for the complete and near complete removal of atomic hydrogen from the sintered alloys. Sintered components may be used as-sintered or can be subjected to high temperature post processing by forging, rolling, flow-forming, extrusion and other processing, achieving superior material performance with properties meeting or exceeding the properties of conventional ingot metallurgy of titanium or titanium alloys of identical compositions at considerably reduced manufacturing costs.

2. Description of Related Art

Manufacturing solid titanium articles by powder-metallurgy is becoming more and more popular in today's industry because it can produce near-shape titanium parts without expensive machining and high temperature forming operations. The quality and mechanical properties of commercially-pure titanium or titanium alloy articles manufactured by the room temperature consolidation of the powders and the sintering of green compacts depend upon powder composition, particularly, the content of contaminants such as oxygen, iron, magnesium, chlorine, and other impurities. On the other hand, the cost effectiveness of the powder metallurgy approach depends upon the costs of titanium or titanium hydride powders, which are determined by powder manufacturing steps, especially the costs of reduction and purification operations.

Known processes of manufacturing titanium powders from titanium sponge or sponge-like product include the manufacturing of titanium sponge itself by: (a) magnesium-thermic reduction of titanium chlorides in a reaction retort, (b) preliminary distillation of the reaction mass to the content of magnesium chloride of 5-12%, (c) cooling the obtained titanium sponge block in argon, followed by (d) crushing and grinding the sponge into powder having a particle size of 0-12 mm, (e) preliminary drying of the powder at <250° C., (f) cooling and additional grinding, (g) final distillation of titanium powder from magnesium chloride residues by vacuum separation, (h) hydro-metallurgical treatment, (i) final drying, and (j) final grinding and screening of the titanium powders. Multi-step distillation and hydro-metallurgical treatments make the technology time-consuming, expensive, and economically unproductive.

Numerous disclosures for magnesium-reduction of titanium tetrachloride $TiCl_4$ and the subsequent processing of the obtained titanium sponge are present in the art, starting from U.S. Pat. No. 2,205,854, granted to Wilhelm Kroll in 1940.

Commercial titanium is conventionally produced through Kroll's process which can be written as follows (e.g., for Ti production):

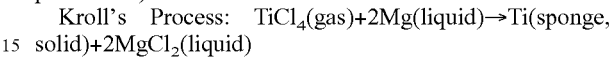

Most developments have been directed towards improving the quality of the sponge by diminishing the final content of magnesium, chlorine, oxygen, and iron contaminants. Various energy-saving and cost-effective processes in sponge-related technology have been developed during the last two decades; however, solid state processing, like that of powder metallurgy, creates interstitials that degrade the mechanical properties of the produced titanium and titanium alloys and make them unweldable.

Most commercially used titanium powders are produced by a hydride-dehydride (HDH) process, as disclosed in U.S. Pat. No. 6,168,644, by gas atomization, or by the plasma-rotating electrode process, as disclosed in U.S. Pat. No. 6,136,060. Raw materials for the HDH process are either wrought titanium metal, produced by conventional ingot metallurgy processes, or titanium sponge. Both of these raw materials are hydrogenated; then the brittle hydrogenated titanium is ground to the desired powder sizes which are subsequently heated in a vacuum to dehydrogenate them. Essentially, titanium powder production from both titanium wrought alloy and sponge is a multi-step, high-energy, high-cost industrial process. Manufacturing titanium sponge, in particular, is the most expensive part of this technology. Both of these raw materials have their distinctive drawbacks. Titanium powders produced from wrought titanium and titanium alloys are very expensive. Their high production costs come from costly titanium sponge production and very expensive processing costs, that include melting and other high temperature operations. Although titanium sponge is less expensive than the raw material used in HDH powder production, the sponge is always contaminated by impurities such as chlorine, magnesium, sodium, and others. These impurities, an unchangeable trait of HDH-processed sponge, are responsible for inferior fatigue, inferior dynamic properties, and inferior weldability in their alloys.

Other well known drawbacks of titanium powder production from titanium sponge have contributed to the use of the expensive $TiCl_4$ reduction and distillation processes. In these processes, the first stage of vacuum separation is carried out at 1020° C., which results in a solid sintered block of the reaction mass and increases the time of sponge distillation. Double-stage vacuum separation, accompanied by multi-stage drying and sponge size reduction increases oxygen content, processing time, and electric energy consumption, and significantly decreases the efficiency of the sponge manufacturing process. When powder is produced from this sponge, multi-stage grinding and hot drying additionally increase the content of gaseous impurities and, in particular, the oxygen content in the obtained powders.

There is a new process described in U.S. Pat. No. 8,007,562 granted to S. Kasparov et al. which discloses the manufacture of pure titanium hydride powder from magnesium-reduced sponge-like hydrogenated porous titanium compound within one production cycle. Any additional hydrometallurgical treatment of the produced powder is excluded, while the exhaust materials of the process such as, magnesium and magnesium chloride, can be readily utilized. This process has made great progress in the quality and productivity of titanium hydride powder, however, it is unhelpful when applied to the manufacture of alloyed titanium powders.

In most of above mentioned sponge manufacturing processes, a periodic removal of magnesium chloride exhaust from the bottom of the retort, as well as reaction interface cooling via argon flow, reduces sponge production time, but there are no gains in either cost-reduction or energy consumption for the overall powder manufacturing process.

The same insignificant result in powder cost reduction is achieved in the process disclosed in JP 61012836, 1986, although some improvement in sponge yield is achieved by the predetermined blowing of $TiCl_4$ at a temperature of <600° C. under argon into molten magnesium. Electric power consumption is decreased by 20% using a condensing vessel in the reactor, promoting the removal of unreacted magnesium and residual magnesium chloride from the reaction zone. This energy saving is associated with sponge production, but does not affect the subsequent powder production process. Powder production requires the further processing of ductile sponge, which needs to be hydrated/dehydrated repetitively with multi-stage processing. The productivity of the magnesium-thermic process is increased by the preliminary cleaning of $TiCl_4$ and its accelerated supply into the reactor. This method also relates only to sponge production and improved sponge quality.

Supplying hot argon through the reaction mass can also speed up the distillation process because it vaporizes the magnesium and magnesium chloride in gaseous form, as disclosed in the U.S. Pat. No. 3,880,652. But the additional expenses associated with heating and supplying high-temperature argon override any production cost savings gained in using it during the distillation stage.

The processes described in U.S. Pat. No. 6,638,336 granted to Drozdenko et al. manufacture titanium powder by (a) magnesium-thermic reduction of titanium chlorides, characterized by the formation of a hollow block of the reaction mass that has an open cavity in the center of the block, (b) thermal-vacuum separation of the hollow block from excessive Mg and $MgCl_2$ at 850-950° C., (c) cooling of the obtained titanium hollow block in a $H_2$-contained atmosphere at an excessive hydrogen pressure, (d) crushing and grinding the hydrogenated titanium block, and (e) hydro-metallurgical treatment of obtained titanium powder in a diluted aqueous solution of at least one chloride selected from magnesium chloride, sodium chloride, potassium chloride, or titanium chloride. The hydro-metallurgical treatment of titanium powder significantly increases labor and processing time, but does not provide a powder of desirable purity, since it contains up to 1% magnesium and chlorine.

The manufacture of high-purity titanium sponge lumps includes crushing the titanium sponge to a particle size of 12-25 mm, followed by its heat-treating at a reduced argon pressure of 600-1100° C. Crushing and heat treatment are repeated several times until the desired purity of the coarse titanium is reached. This method is ineffective for commonly used titanium, and requires HDH processing to obtain powders with the sizes required for industrial applications.

All other known methods of producing titanium, titanium hydride, or alloyed titanium hydride powders from magnesium-reduced sponge or sponge-like porous titanium compound have the same drawbacks: cost and energy savings are realized in only one or two stages of the various manufacturing steps. No known method offers savings throughout the continuous multi-stage processes, and therefore, none of these processes is truly cost-effective.

No one conventional process (except the one described in U.S. Pat. No. 8,007,562) provides a usable and low cost method for manufacturing hydrogenated titanium and/or titanium alloy powder. This is because most of these known processes relate to the manufacturing of sponge lumps which are ductile and need to be treated by the HDH process. In contrast to U.S. Pat. No. 8,007,562, embodiments of the present invention allow for the manufacturing of alloyed titanium hydride powders in one reaction cycle, simultaneously with the reduction of titanium tetrachloride, and improves total productivity and energy saving for the entire process.

No one conventional titanium powder production process can produce low oxygen (below 0.13%) sintered and hot-formed titanium and titanium alloy parts within one production cycle.

Also, none of the processes known from prior art can provide a high productivity titanium powder along with a sufficiently purified hydrogenated titanium powder within just one production cycle. All finished components require additional purification in order to remove impurities, especially magnesium and magnesium chloride, to concentrations required for critical applications and specified in corresponding standards. As a result, the powder metallurgy titanium and titanium alloy components produced from titanium sponge exhibit inferior properties when compared to identical titanium alloys produced through traditional ingot metallurgy. Additionally, the powder metallurgy titanium alloys produced based upon the prior art method are not weldable.

SUMMARY

An objective of an embodiment of the invention is to manufacture pure titanium hydride powders and alloyed titanium hydride powders from a magnesium/hydrogen-reduced sponge-like hydrogenated porous titanium compound within one production cycle. Any additional hydrometallurgical treatment of the powder produced by the proposed manufacturing method may be excluded, while the bi-products materials such as magnesium, chlorine, and magnesium chloride, can be removed and readily utilized.

It is also an objective to provide the cost-effective and highly-productive manufacture of purified titanium hydride powders and alloyed titanium hydride powders from magnesium- and hydrogen-reduced porous titanium compounds.

Yet, another objective of the invention is to cut the time of thermic-reduction reactions in the retort by 15-20%, and to simultaneously improve the percentage of magnesium usage from 40-50% to 70-80%.

There remains a need to achieve a more effective distillation due to additional deformation and fracturing of the closed pores in hydrogenated titanium sponge which result in the more effective evaporation of magnesium and magnesium chlorides from the pores during the vacuum distillation step.

The nature, utility, and further features of embodiments of this invention will be more apparent from the following detailed description, with respect to the preferred embodiments of the invented technology.

Some or all of the needs described above can be met by the methods described herein, and by the pure titanium hydride and alloyed titanium hydride powders that are the result of these methods. The disclosed methods contain embodiments of processes used for manufacturing high purity powders and for their use in manufacturing near-net shape titanium and titanium alloy articles by sintering titanium hydride and alloyed titanium hydride powders produced from the combined hydrogen-magnesium reduction of titanium chlorides and halides of other metals. The embodiments of the methods disclosed herein resolve many, or all of the problems related to the purity of sintered powders: insufficient strength, insufficient density, low fatigue and dynamic properties, poor weldability, insufficient productivity, and cost reduction that have been described above, and that have not been solved by the art.

Our invention proposes a process that can transform the titanium production because it overcomes the technical challenges of the Kroll's process by partially replacing molten Mg with $H_2$ gas as a reducing agent as follows:

Invented Reduction Process: $TiCl_4(gas)+(1-2)H(gas)+(1-2)Mg(liquid) \rightarrow TiH_2(sponge, solid)+(1-2)MgCl_2(liquid)+(0-2)HCl(gas)$ This modification of the reaction process can transform the basic metal production step as well as the downstream fabrication processes, primarily on account of producing a friable metal hydride instead of a hard Ti sponge. This hydride can be easily removed from the reactor and crushed into powder that shortens the time for removal of $MgCl_2$ by vacuum distillation by 80%. The distillation-purified hydride powder is then simultaneously dehydrided and sintered by powder metallurgical process into rods, tubes, plates, etc.

The powder metallurgical approach, unlike the wrought metallurgy approach following Kroll's process, reduces the scrap from 50% to only ~2% while ensuring that the mechanical properties and purity is at par with conventionally produced material. Thus, hydrogenation followed by simultaneous dehydrogenation, and sintering are two innovative aspects of our invented process that are the key in reducing the cycle time to <24 hours (i.e., 5-fold reduction) leading to ~50% energy savings and cost reduction of ~20%.

The embodiments of the methods for manufacturing the special hydrogenated titanium and titanium alloy powders described herein overcome these problems by introducing titanium hydride powder, metal halides, and gaseous hydrogen, together or separately, into liquid magnesium during the reduction of the titanium tetrachloride, starting from the beginning of the reduction reaction. The amount of titanium hydride powder is in the range of 0.1-10 wt. % of the titanium product to be produced from the titanium tetrachloride for the whole processing cycle.

The additional titanium hydride powder introduced together with titanium tetrachloride beneficially affects the kinetics of the magnesium-thermic reduction process due to the formation of the additionally-emitted atomic hydrogen, which helps to reduce oxides in the system, and by doing so, cleans the inter-particle interfaces of the product and enhances the diffusion between all of the components of the powder mixture.

Introducing the metal halides together with titanium tetrachloride and titanium hydride powder into the reaction retort beneficially affects the manufacture of pure titanium hydride powder or alloyed titanium hydride powder due to the magnesium-thermic reduction of alloying metals that takes place simultaneously with the titanium, and that promotes the formation of the final and contamination-free titanium alloy compositions at the very first step of the process instead of the ineffective mixing of titanium and alloying powders which must be performed prior to the consolidation of blends.

The presence of hydrogen in the titanium lattice promotes the effects of $TiCl_4$ reduction and also improves the efficiency of the distillation taking place during the reduction and distillation processes, in addition to reducing the time required to complete both processes. This beneficial effect of hydrogen is associated with an increased concentration of defects in the crystal lattice, and becomes even more apparent when phase transformation takes place as a result of temperature changes. In addition, hydrogen reduces the temperatures required for both processes by reducing the temperature of polymorphic transformation to below that of the established temperature for pure titanium, which is 882.5° C. The α- to β-titanium polymorphic transformation of the Ti-0.15 wt. % H alloy starts at 319° C. and is completed at about 800° C., the α- to β-titanium polymorphic transformation of the Ti-1.33 wt. % H alloy is started and completed at about 319° C., and the δ- to β-titanium polymorphic transformation of the Ti-3.85 wt. % H alloy is completed at 797° C. In other words, the content of hydrogen significantly decreases the temperature of polymorphic transformation, which positively affects the processes of reduction and distillation.

This also reduces processing temperatures, and results in a considerable reduction of the iron and other metal pick up that occurs in the process because of contact between the compounds and the metal retort, to temperatures that are 50-250° C. lower than those used in conventional technology. Decreasing temperatures result in decreasing diffusion exchange activity between the retort and the formed mass of pure titanium hydride or alloyed titanium hydride. Besides, the presence of hydrogen in titanium or titanium alloy, minimizes contamination by diffusion.

In one embodiment, the method includes:

(a) filling a reaction retort with solid metallic magnesium to be melted, or with liquid metallic magnesium, and supplying hydrogen onto the magnesium surface and in the body of the liquid magnesium at 750-850° C., followed by the dissolution of hydrogen into the liquid magnesium up to saturation (Magnesium can be introduced into the retort either part by part or instantaneously), (b) supplying liquid titanium tetrachloride $TiCl_4$ into the retort filled with liquid magnesium to reduce titanium from the titanium tetrachloride and to form magnesium chloride as a byproduct of this reaction, (c) introducing at least one component from the group consisting of titanium hydride powder, other metal hydrides, gaseous hydrogen, and metal halides, together with liquid titanium tetrachloride $TiCl_4$, in the form of a pulp, into the retort, whereby the amount of titanium hydride powder is in the range of 0.1-10 wt. % of the titanium product to be produced from the titanium tetrachloride for the whole processing cycle, (d) dissociation of the titanium hydride into titanium and hydrogen at 750-850° C., followed by forming hydrogen gas micro-bubbles, which are bubbling both liquid phases of magnesium and magnesium chloride, increasing the reduction rate of the process by increasing an effective surface of reacting phases, destroying the magnesium chloride film on the surface of the molten magnesium, and generating a turbulent gas phase above the liquid in the retort, (e) dissolution of hydrogen in the reduced titanium metal to the end of the reduction reaction at 750-850° C., in amount of 30-180 cm³ of hydrogen per 1 g of titanium, and the formation of a sponge-like titanium hydride, having a composition about $TiH_x$, where x is in the range of 0.3-2, (f) vacuum separation of the titanium hydride sponge block at 1000-1050° C., accompanied by the homogenization of the alloyed titanium hydride and the additional emission of hydrogen from the titanium hydride, the destruction of the sponge's closed pores due to the density differences between the hydrogenated materials because of their varied hydrogen content, as well as the density differences of the materials that result from the phase transformations that take place at different temperatures, and that promotes the removal of residual magnesium and magnesium chloride, (g) supplying additional cold hydrogen into the retort after removing a part of the magnesium and magnesium chloride, in order to decrease the temperature in the center of the retort down to 600-640°0 C., accompanied by a polymorphic transformation, and the additional hydrogenation of the titanium sponge, by cooling the retort from outside, whereby the cooling rate is maintained due to high thermal conductivity of hydrogen, (h) at least partial crystallization of metallic magnesium and magnesium chloride that results in additional stresses in the titanium hydride sponge block, resulting in at least partial disintegration of the sponge, and providing the evaporation and easy removal of magnesium and magnesium chloride during the subsequent step of vacuum separation, (i) raising the temperature of the metal hydride sponge block in the center of the retort to 1000-1050° C., by supplying hydrogen, which provides a high heat transfer throughout the retort due to its high thermal conductivity, and results in the substantial reduction of the total time and energy required for separation, (j) de-hydrogenating the sponge block at 1000-1050° C. in a vacuum, followed by hydrogenation at temperatures of 600-640° C., and promoting the destruction of pores in the sponge block, the result of the phase transformations at different temperatures, and specifically because the newly formed compositions have changed lattice structures and changed bulk densities, all of which reduces the time for total separation, (k) final removal of magnesium chloride $MgCl_2$ and metallic magnesium from the sponge block by vacuum separation, (l) cooling the sponge block, in the hydrogen atmosphere, to room temperature by permanently purging hydrogen through the retort, resulting in an increase of the brittleness of the titanium hydride sponge, and in saving the amount of energy needed to disintegrate the sponge in the retort, and (m) mechanical disintegration of the titanium hydride sponge block inside the retort, as well as the alloyed titanium hydride sponge block, after hydrogenation, in the hydrogen atmosphere cooling process, as described in step (l), whereby the disintegration is carried out in one of the following atmospheres: hydrogen, inert gas, and a vacuum.

Metal halides are selected from the halides of alloying components which, when reduced in the retort together with titanium tetrachloride, will form the alloyed titanium hydride powders that will be further transformed into titanium alloy during appropriate dehydrogenation and sintering. These halides are represented by the general formula $MeHl_x$ (where Me is a metal such as Ti, V, Al, Mo, Cr, Nb, Zr, Fe, Pd, Ru, Ni, W, Ta, Sn, Co, and Hl is chloride, fluoride, bromide, iodide).

The alloying components are added into the retort, not only as metal halides, but also in the form selected from solid powders of individual metals, master alloys, metal hydrides, and combinations thereof.

Metal hydrides such as vanadium hydride, chromium hydride, zirconium hydride, molybdenum hydride, and other metal hydrides are introduced into the retort simultaneously with the titanium hydride powders, whereby the amount of titanium hydride powders with 0-3.85% hydrogen content is introduced together with gaseous hydrogen.

The gaseous hydrogen is introduced into the retort before, simultaneously, or after the introduction of the titanium hydride powder, metal halides, individual metal powders, and master alloy powders.

Additional amounts of titanium dioxide $TiO_2$ powder can be introduced into the retort in amounts varying from 0.01 wt. % to 10 wt. %, based on the total weight of the retort charge, in order to control the oxygen content being dissolved into the titanium hydride particles. An oxide layer, formed on the surface of the titanium hydride particles, may interfere with sintering, but this oxide layer is removed by the atomic hydrogen that was emitted during the dehydration of said titanium hydride.

The inner surface of the retort is covered by niobium-, molybdenum-, or tantalum-containing sheets or foils, which maintains the temperatures of the reduction and separation processes, and prevents any contamination of the produced titanium hydride powders from the iron, nickel, and chromium of the retort material.

After the completion of the pure or alloyed titanium hydride purification by vacuum separation, the resulting titanium hydride or alloyed titanium hydride powders are ground inside the retort to the required particle size by using mechanical crushing, for example, by rotating knives. Next the powders are removed from the retort by pneumatic transport in argon, or in another protective atmosphere, and the powders are then packed into drums without ever contacting atmospheric air.

Then, the cold compaction of pure or alloyed titanium hydride powders may be carried out under argon, to manufacture low-oxygen green articles, which are not exposed to air before sintering.

A special sintering cycle may be used to completely or partially remove hydrogen from the compacted green particles. The sintering cycle is carried out in three steps:

heating to initial dehydrogenation temperature, up to 350-450° C., using special furnace fixtures for the removal of emitted hydrogen, heating to temperatures where complete hydrogen removal takes place, at 650-750° C., holding at this temperature for a time equal to the thickness of the cross-section in inches multiplied by 30 minutes, and subsequently sintering at 1200-1300° C.

The sintered titanium or titanium alloy articles are then subjected to either high temperature or room temperature processing operations, such as forging, rolling, extrusion, flow forming, etc.

The embodiments described herein are desirable because they provide a cost-effective method for manufacturing purified titanium hydride and alloyed titanium hydride powders, as well as near-net shape titanium and titanium alloy articles. The embodiments described herein are so economical because their processes are performed without any contact with either oxygen or iron, with all operations being performed within one thermal cycle and in one reaction retort run followed by oxygen-free handling, special sintering and subsequent hot-forming.

DETAILED DESCRIPTION OF SPECIFIC EMBODIMENTS

The methods described herein can be more clearly understood by reference to the following description of the specific embodiments and examples, which are intended to illustrate, rather than to limit, the scope of the appended claims.

As used herein, the terms "around" or "about" in connection with a numerical value denote a deviation from the numerical value of ±5%.

As described above, the methods disclosed herein relate generally to the manufacture of pure titanium hydride powders and alloyed titanium hydride powders, produced by combined hydrogen-magnesium reduction of titanium chlorides and halides of other metals, followed by the manufacture of near-net shape titanium and titanium alloy articles (slabs, sheets, strips, bars, and pipes) by room temperature consolidation, sintering, and the subsequent hot deformation of the sintered parts. Pure alloying components, master-alloys, and metal hydrides, can also be introduced into the reaction retort together with titanium chlorides, titanium hydride powder, and metal halides. The amount of titanium hydride powder that is introduced, ranges from 0.1-10 wt. % of the final titanium alloy that will be produced from the titanium tetrachloride throughout the processing cycle.

The introduction of titanium hydride powder, metal halides, and gaseous hydrogen, together or separately, into liquid magnesium during the reduction of titanium tetrachloride: (a) increases the productivity of titanium parts manufactured from powders by saving vacuum separation time and the hot deformation time of the sintered products, (b) facilitates the alloying of titanium and titanium hydride powders, and (c) improves the purity of the resulting metals and alloys, reduces the processing temperatures, and minimizes metal contaminations from the metallic retort.

The introduction of all of the above mentioned components, together with traditional titanium tetrachloride, into the liquid or solid magnesium-filled retort, plays a very important role in the chemical reduction and in removing oxygen and other impurities, such as chlorine and magnesium from the resulting titanium hydride particles and sintered titanium or titanium alloy articles, and also prevents oxidation during heating, compacting, sintering, and deformation.

Previously known methods, as described above, have not achieved the desirable process steps and parameters described herein and have not been able to provide high productivity (and subsequently lower production costs) during the magnesium-thermic process, especially during vacuum separation, and have not been able to control the porosity, particle size, and purity of titanium hydride powders or alloyed titanium hydride powders that are critical for manufacturing weldable, high-quality titanium and titanium alloy final products while using the powder metallurgy technique.

The previous methods, described above, manufacture titanium or titanium hydride sponge by: obtaining the powder by grinding it in air, mixing this powder with the powders of alloying components, and then manufacturing the final near-net shape articles by compacting, sintering, and hot deformation. As a result, the full production cycle is very complicated, long, and unable to control powder contamination, and cannot distribute alloying elements in a uniform manner. The final structure of such sintered alloys contains oxides, other impurities, and irregular porosity.

We discovered the embodiments of the process for manufacturing the pure and alloyed titanium hydride powders and titanium alloy articles described herein. The effects and features of the magnesium-thermic reduction of titanium chlorides in the presence of additional substances, namely titanium hydride powder and metal halides, produces sintered titanium and titanium alloy articles with an extremely low content of oxygen, magnesium, chlorine, iron, and other impurities, in addition to cutting the process time and production costs.

The first steps of our invented process are the same as those used in all conventional processes involving the magnesium-thermic reduction of titanium chlorides: (a) filling a reaction retort with liquid metallic magnesium, and (b) supplying liquid titanium tetrachloride $TiCl_4$ into the retort filled with liquid magnesium to reduce titanium from the titanium tetrachloride and to form magnesium chloride as a byproduct of this reaction. We, however, modify this step (a) by supplying additional hydrogen into the retort at 750-850° C., followed by dissolution of hydrogen in liquid magnesium up to saturation, and this is a new step in the process.

Then, in another new step, we introduce titanium hydride powder, gaseous hydrogen, and metal halides (separately or together), with liquid titanium tetrachloride $TiCl_4$, in the form of a pulp into the retort, whereby the amount of titanium hydride powder is in the range of 0.1-10 wt. % of the titanium product to be produced from the titanium tetrachloride for the whole processing cycle. Metal halides are selected from a group represented by the general formula $MeHl_x$ (where Me is a metal such as Ti, V, Al, Mo, Cr, Nb, Zr, Fe, Pd, Ru, Ni, W, Ta, Sn, Co, and Hl is chloride, fluoride, bromide, iodide) and are introduced into the retort, simultaneously with the titanium hydride powder. The exemplary metal halide compounds are aluminum chloride $AlCl_3$, vanadium chloride $VCl_4$, zirconium chloride $ZrCl_4$, chromium chloride $CrCl_3$, nickel chloride $NiCl_2$, tantalum chloride $TaCl_5$, niobium chloride $NbCl_5$, chromium bromide $CrBr_3$, titanium bromide $TiBr_4$, tantalum bromide $TaBr_5$, zirconium bromide $ZrBr_4$, and others.

The titanium hydride particles are immersed into liquid magnesium at a depth of 0.1-0.9 times the total thickness of the liquid metallic magnesium and magnesium chloride phases in the retort. This process initiates convective flows in the liquid phases as they react with the titanium chlorides and alloying metal halides, such as aluminum chloride, vanadium chloride, zirconium chloride, and others. This enhances the reduction of $TiCl_4$ and all of the other metal halides by the magnesium, and also forms active nuclei on the surface of the titanium hydride particles, followed by their enlargement and submerging to the retort bottom.

As this stage of our process takes place at 750-850° C., the titanium hydride is dissociated into titanium and hydrogen, and the hydrogen forms gas micro-bubbles, having diameters most likely in the range of 0.01-5.0 mm, which are bubbling both the liquid phases of magnesium and of the magnesium chloride. The bubbling beneficially affects the rate of the reduction process by increasing the effective surface of the reacting phases by up to 500%. Bubbles that reach the liquid magnesium surface destroy magnesium chloride film on the surface of liquid magnesium, and generate a turbulent gas phase above the liquid in the retort. Moreover, the hydrogen bubbles that are floating from the magnesium bath are surrounded with thin layers of magnesium or magnesium chloride due to surface tension. The bubble flotation is beneficial for mixing the components of the liquid reaction bath, as well as for the intensive heat transfer that takes place in the reaction zone of titanium reduction from $TiCl_4$.

The reduction of titanium tetrachloride $TiCl_4$ and other metal halides is carried out not only by the liquid magnesium and atomic hydrogen emitted from the titanium hydride powder, but also by the purging of gaseous hydrogen at pressure of about 1 bar (about 1 atm), through the liquid magnesium and magnesium chloride layers to produce a solid phase of titanium trichloride $TiCl_3$, which contacts the liquid magnesium that is being reduced to titanium, both on the magnesium bath surface, and in the liquid magnesium at the full depth of the bath, most effectively at the depth of 1-100 mm. Since the titanium metal appears part-by-part in the system due to the reduction reaction, gaseous hydrogen continues to come, and the dissolution of hydrogen in the reduced titanium metal takes place. We carried out the process in such a way as to predetermine the content of the hydrogen in the titanium metal. Particularly, at the end of the reduction reaction at 750-850° C., the titanium contains hydrogen amounts of 30-180 cm³ of hydrogen per 1 g of titanium. This allows us to form a sponge-like titanium hydride that has a composition of about $TiH_x$, where x is in the range of 0.3-1, most likely $TiH_{0.5}$. When alloying metal halides participate in the reaction, the resulting sponge-like product is a mixture of the individual metal hydrides, or of complex hydride compounds, e.g., $(Ti,Al,V)H_x$ or $(Ti,Zr,Al,V)H_x$, or $(Ti,Zr,Mo,V)H_x$, where x is in the range of 0.3-1, most likely $(Ti,Al,V)H_{0.5}$, or a mixture of pure metal hydrides with complex hydrides.

The alloying components are added into the retort in selected forms consisting of individual metal solid powders, any master alloys, metal hydrides, metal halides, titanium chlorides of lower valency, such as $TiCl_2$ and $TiCl_3$, and combinations thereof. Individual metal powders such as Al, V, Mo, Cr, Zr, Nb, Fe, Sn, and mixtures thereof are supplied into the retort with the same pulp as the titanium tetrachloride and titanium hydride powder. The hydrogen gas is introduced into the retort simultaneously, or separately, with the titanium hydride powder, metal halides, individual metal powders, and master alloy powders. The hydrogen gas, however, can be purged from the retort before or after the titanium hydride powder, metal halides, individual metal powders, and master alloy powders with the same effect, but the parameters of the process require a slight correction.

Both the reaction of solid titanium trichloride $TiCl_3$ with magnesium in the certain depth of the bath, and the reaction of hydrogen in the space above the bath, are favorable for expanding the zone of active heat transfer. This is due to the exothermic reaction of the titanium reduction. This reaction improves the heat sink from the retort surface and enhances the productivity of the process, a process which is usually limited by the rate of heat sink from the reaction zone.

After the process of forming the titanium hydride or alloyed titanium hydride sponge block is completed, we start the first step of the sponge block's vacuum separation at 1000-1050° C., accompanied by additional hydrogen emission from the titanium hydride and other metal hydrides for the purpose of removing residual magnesium and magnesium chloride. This sponge block's temperature decreases during this process due to the heat generated by the evaporation of the magnesium metal and magnesium chloride, as well as the heat generated from the transformation of $TiH_x \rightarrow Ti$, where x is in the range of 0.3-1. The alloyed complex titanium hydrides are homogenized at the same time. Homogenization takes place via the diffusion of alloying elements in the solid phase, aiding in the uniform distribution of the alloying elements, and further eliminating an adversely affected Kirkendall Effect, which may lead to high porosity of sintered articles.

Heating to 1000-1050° C. and holding at this temperature, causes the additional emission of atomic hydrogen from the titanium hydrides. The hydrogen content in the titanium goes down by a factor of 2.0-2.5, according to the isotherm of dissolution of hydrogen at atmospheric pressure, and by a factor of 20 in vacuum, at the pressure accepted for vacuum separation. As the density of the titanium goes up from 3.75 to 4.5 g/cm³, during the hydrogen emission from the titanium hydride, a deformation of the titanium sponge occurs due to allotropic changes in the different adjacent parts of the sponge. This deformation also destroys closed pores, and consequently, releases magnesium and magnesium chloride vapors from the sponge. Besides, the contact of atomic hydrogen with magnesium chloride results in a chemical reaction that forms hydrogen chloride, which evaporates and carries chlorine away from the sponge. Therefore, the chlorine content of the final product is very low. A similar effect decreases the carbon content in the final product. This is due to the reaction of atomic hydrogen with carbon impurities at high temperatures, followed by the evaporation of these hydrocarbons.

In order to improve the hydrogenation of the partially separated titanium, we start to cool the retort from the outside and supply additional hydrogen into the retort, after removing a part of the magnesium and magnesium chloride, when the temperature in the center of the retort goes down to 600-640° C. The cooling rate decreases at a fast rate because hydrogen's high thermal conductivity makes heat transferring very effective. We begin supplying the hydrogen in a period of time that is approximately 1/10 of total time needed for vacuum separation, for example, at about 1 hour when the total production cycle takes about 10 hours for the reaction retort containing 7.5 tons of metal product.

Cooling the system results in at least a partial crystallization of the metallic magnesium and magnesium chloride still existing in the retort. In turn, the formation of different solid phases in the system adds more stress on the sponge block and causes at least a partial disintegration of the sponge. The destruction of the sponge block improves evaporation conditions and eases the removal of magnesium and magnesium chloride, during both this step, as well as in the second step of vacuum separation. It is pertinent to note that the initially formed sponge block has a lower amount of closed pores than that used in the conventional processes of prior art. This is because the above mentioned flotation of hydrogen bubbles destroys some closed pores that contain residual magnesium inside them. This is also important for the effectiveness of vacuum separation, and besides, this improves the coefficient of the use of magnesium in the process from 50-60% to 70-80%.

Then, we raise the temperature of the metal hydride sponge block in the center of retort up to 1000-1050° C., again due to the high thermal conductivity of the supplied hydrogen. This cuts the total time of separation upon the heat transfer. The process of separation is accomplished in two steps. After the first step (which takes about 1/10 of the whole cycle time), when the main part of the magnesium and magnesium chloride is removed, and the temperature in the retort tends to diminish, hydrogen fills the retort. That hydrogen has a high thermal conductivity factors into the fast heating of the retort's center and this drastically cuts the total time of the separation step's "upon the heat" effect.

The second step of separation includes the dehydrogenation of the sponge block at 1000-1050° C., followed by hydrogenation at temperatures of 600-640° C. Hydrogenation-dehydrogenation at this stage also promotes the destruction of the sponge block's closed pores and cuts the total time of the separation "upon the different density" effect.

Finally, the separation concludes with cooling the sponge block in the hydrogen atmosphere, by permanently purging the hydrogen through the retort to room temperature, destroying the sponge block's closed pores due to the additional stresses initiated by the titanium hydrides' difference in densities, the result of their varying hydrogen contents. Thus, we offer a new, two-step mode for the separation that is characterized by the effective removal of magnesium chloride $MgCl_2$ and metallic magnesium from the sponge block.

After being cooled to room temperature, the titanium hydride sponge block (or the alloyed titanium hydride sponge block) is mechanically disintegrated by any appropriate tools, and particularly, by rotating cutters located in the retort, to obtain the product powder. The titanium hydride sponge is easily crushed and disintegrated into powder having a particle size down to 10 microns. We have experimentally demonstrated the possibility of manufacturing powder directly in the retort.

The powder contains hydrogen in a range of 3.50-3.85 wt. % (for pure titanium) and 2.0-3.5 wt. % (for titanium alloys) after hydrogenation that follows from cooling in a hydrogen atmosphere. The disintegration is carried out in any one of the following atmospheres: inert gas, hydrogen, and vacuum. The produced powder is moved from the retort, by pneumatic transport in argon atmosphere, and is packed into drums without ever contacting air. Cold compaction of the titanium hydride powder or the alloyed titanium hydride powder is also carried out under argon, manufacturing oxygen-free, green articles before sintering. These operations provide reactive powders with additional protection from oxidation and allow the manufacturing of green pre-forms with extremely low oxygen contents. Both cold compaction and sintering can be done with other metal hydrides, which are produced together with the said titanium hydride in the same retort, or separately in other reaction cycles. Anyway, the compaction of any of the mentioned metal hydride mixtures is also carried out under argon, manufacturing oxygen-free, green titanium alloy articles before sintering.

The compacted titanium hydride or alloyed titanium hydride green articles are sintered in three stages. The first stage involves heating to the initial dehydrogenation temperature of up to 350-450° C., using special furnace fixtures to remove the emitted hydrogen, heating to temperatures 650-750° C. where complete hydrogen removal takes place, holding at this temperature for a time equal to the thickness of the cross-section in inches multiplied by 30 minutes, and followed by sintering at 1200-1300° C. Once the sintered titanium or titanium alloy articles have been cooled to a temperature of 750-1150° C., they can be subjected to one-run hot rolling, forging, or pressing. Thus, we have found that our invention is the most productive and cost-effective way to manufacture near-net shaped titanium and titanium alloy articles. Our invention is so efficient and cost-effective due to the extremely low contaminant contents, and because of the uniform distribution of alloying components, in the sintered titanium alloys produced by our processes.

We have discovered from our experimental studies, that the high brittleness of titanium hydride and the other positive effects of our novelty (the introduction of additional titanium hydride powder and metal halides into the magnesium-thermic reaction) can be significantly enhanced by controlling pressure, temperature and time throughout the titanium reduction process. In particular, we found that the most ideal conditions for titanium reduction from titanium chlorides occur within the parameters exhibited in the claims and examples of our invention.

We also found that metal hydrides, such as vanadium hydride, chromium hydride, zirconium hydride, molybdenum hydride, and other metal hydrides, can be introduced into the retort simultaneously with the titanium hydride powder and metal halides. These metal hydrides are also effective precursors for alloying titanium hydride sponge (powder), and subsequently, the resulting sintered titanium alloy with a controlled oxygen content.

The powder of titanium dioxide $TiO_2$ was additionally introduced into the retort in an amount ranging from 0.01 wt. % to 10 wt. %, based on the total weight of the retort charge, in order to control the oxygen content dissolved into the titanium hydride particles. An oxide layer, which theoretically can be formed on the surface of the titanium hydride particles, may interfere with sintering, but this oxide layer is removed by the atomic hydrogen that is emitted during the dehydration of the said titanium hydride. In our experiments with a powder mixture that including titanium dioxide additive, we did not see any deterioration in the sintering process, nor in the quality of the final product.

We also found that cladding the inner surface of the retort with oxidation-resistant and chemically-stable metals was effective. We successfully tested the retort, after having the inner surface covered by metal sheets or foils of niobium, molybdenum, tantalum, and their alloys, these metals maintained the temperature of the reduction and separation processes, and prevented the contamination of the resulting titanium hydride powder by the iron, nickel, and chromium of the retort material. The thickness of such protective foil or sheet can vary in a wide range, from 0.1 mm to 2 mm. Cladding the inner surface of the retort maintains the reaction temperature in the retort, and also cuts the process time without damaging the retort walls. We also revealed that titanium hydrogenation in the retort without any oxygen access enhances the brittleness of the titanium hydride, and this makes it possible to manufacture the powder using low-energy consumption.

The foregoing examples of the invention are illustrative and explanatory. The examples are not intended to be exhaustive and serve only to show the possibilities of the technology disclosed herein.

Example 1

The pure titanium hydride powder was manufactured, according to an embodiment of the invention, using the following raw materials, chemicals, and gases:
titanium tetrachloride as a source of titanium,
metallic magnesium as a reducing agent,
hydrogen as a reactive shielding atmosphere and reducing agent, and
titanium hydride powder $TiH_2$ as an additional source of titanium and also as a source of atomic hydrogen.

The process included the following steps:
(a) Metallic magnesium was melted and poured into the retort, then hydrogen gas was supplied to the magnesium mirror (the surface of liquid metal) at 850° C. The system was held for 10 min for the dissolution of the hydrogen into the liquid magnesium up to saturation;
(b) Liquid titanium tetrachloride $TiCl_4$ was supplied from an inlet pipe into the retort filled with the liquid magnesium, and the magnesium-thermic reaction was started, producing a metallic titanium sponge and magnesium chloride as a byproduct of this reaction;
(c) Titanium hydride powder was introduced into the retort together with liquid titanium tetrachloride $TiCl_4$ in the form of a pulp. The amount of titanium hydride powder was 160 g, or 0.1 wt. % of the titanium product weight to be produced from the titanium tetrachloride for the whole processing cycle, specifically, 160 kg of resulting titanium hydride sponge. To manufacture 160 kg of titanium hydride, we had to supply 620 kg of titanium tetrachloride into the retort. In so doing, the 160 g of titanium hydride powder, with a particle size of about 10 microns developed about 8.5 billions of new nuclei of crystallization. Such a huge number of new nuclei significantly sped up the reduction of the titanium tetrachloride because every second about 236,000 new nuclei were formed within the 10 first hours of the process.

When the particles of the titanium hydride powder reached the liquid magnesium mirror, they were immersed in the bath of liquid metallic magnesium and magnesium chloride phases in the retort. These solid particles immediately started to emit atomic hydrogen, and initiated convective flows in the liquid phases, enhancing the reduction of $TiCl_4$ by the magnesium. Also, active nuclei were formed on the surface of titanium hydride particles, followed by their raising up and then submerging to the retort bottom;

(d) Hydrogen gas micro-bubbles are formed due to the dissociation of the titanium hydride into titanium and hydrogen at 850° C. These bubbles had diameters ranging from 0.01 mm to about 5.0 mm. The bubbling increased the rate of the reduction process by increasing the effective surface of the reacting phases by up to 500%. Also, they destroyed the magnesium chloride film on the surface of the molten magnesium, and generated a turbulent gas phase above the liquid in the retort;

The reduction of the titanium tetrachloride $TiCl_4$ was carried out not only with liquid magnesium, but also by purging additional gaseous hydrogen through the liquid magnesium and magnesium chloride layers. Together with the hydrogen gas emitted from titanium hydride powder, the supplied hydrogen reacted with the titanium tetrachloride $TiCl_4$. This produced a solid phase of titanium trichloride $TiCl_3$, which when it contacted the liquid magnesium, was reduced to titanium both on the magnesium bath surface, and in the liquid magnesium at a depth of 1-100 mm, or deeper;

(e) At the same time, hydrogen was dissolved into the reduced titanium metal, at the end of the reduction reaction at 850° C., in an amount of up to 180 cm³ of hydrogen per 1 g of titanium, and this formed a sponge-like titanium hydride, that had a composition of about $TiH_x$, where x is in the range of 0.3-1, for example, $TiH_{0.5}$;

(f) After the titanium hydride sponge block was formed, it was subjected to vacuum separation at 1050±10° C., this emitted additional hydrogen from the titanium hydride. This additional atomic hydrogen enhanced the removal of any residual magnesium and magnesium chloride from the sponge block's pores.

Besides, the temperature of the sponge block decreased due to the heat of the evaporation of magnesium metal and magnesium chloride, and because of the endothermic transformation $TiH_x \rightarrow Ti$ (g) The retort was cooled from the outside while additional cold hydrogen was supplied into the retort, at a pressure of about 1 bar (1 atm), following the removal of a main part of the magnesium and magnesium chloride, which was removed when the temperature in the center of the retort went down from 1050° C. to 640° C. Significant thermal stresses appeared in the sponge block due to its polymorphic transformation, the additional hydrogenation of titanium to $TiH_2$, and the crystallization of magnesium and magnesium chloride below the sponge block. These stresses broke the walls of the sponge block's pores, and previously closed pores opened up, improving conditions for vacuum separation;

(h) Once the sponge block had cooled, a full crystallization of metallic magnesium and magnesium chloride occurred, and additional stresses appeared within the titanium hydride sponge block, causing the partial disintegration of the sponge. This effect improved the evaporation and eased the removal of magnesium and magnesium chloride during the second step of vacuum separation;

(i) The temperature of the metal hydride sponge block was again raised up to 1050° C. in the center of retort, due to the high thermal conductivity of the supplied hydrogen. That cut the total time of separation upon the heat transfer from 18 hours to 12 hours for the retort of 160 kg, and from about 100 hours to about 60 hours for the retort of 7500 kg load, based on the titanium weight in the final product. When the temperature of the sponge block reached 1050° C., the hydrogen gas supply was stopped, and vacuum pumps were turned on to provide a vacuum in the retort and to accomplish the second, final step of vacuum separation. Both the magnesium and the magnesium chloride were completely removed from the titanium hydride sponge;

(j) Then, the sponge block was de-hydrogenated at 1050° C., and the temperature went down. When the temperature reached 600-640° C. and continued to go down, the process of dehydrogenation was switched to hydrogenation, by supplying hydrogen gas again. Both the thermal stresses and the appearance of the new hydride phase promoted the destruction of the sponge block's closed pores, freeing the magnesium and magnesium chlorides for evaporation. Thus, the temperature parameters in steps (g) to (j) that decreased the total time of separation by up to 20 hours due to changes in the lattice structures and in the bulk densities of the different titanium hydride phases that appeared because of phase transformation;

(k) After vacuum separation is completed, the sponge block was cooled to room temperature in the hydrogen atmosphere by permanently purging hydrogen through the retort. The cooling process was accompanied by the additional destruction of the sponge block's closed pores due to the additional stresses initiated by the difference in density between the liquid and solid phases, and (l) The cold titanium hydride sponge block was mechanically disintegrated by rotating the cutter directly into the retort, under the protective argon atmosphere. The ratio of the cutter diameter $D_C$ to the inner diameter of the retort $D_R$ is about 0.92. The resulting particles of titanium hydride $TiH_2$ powder had a particle size in the range of 10-600 microns. The content of hydrogen in the $TiH_2$ powder was in the range of 3.70-3.85 wt. %, and the content of interstitials was very low: magnesium—less than 10 ppm, chlorine—less than 15 ppm, oxygen—less than 400 ppm, iron—less than 200 ppm, following hydrogenation during the process of cooling in a hydrogen atmosphere according to step (l).

The inner surface of the retort was covered by niobium sheets, which prevented the contamination of the resulting titanium hydride powder with the iron, nickel, and chromium of the retort material. The resulting titanium hydride powder was replaced from the retort by pneumatic transport, using argon, followed by packing the powder into drums without any contact with air.

Cold Isostatic Pressing of 570 lbs of powder was carried out in a rubber mold filled with argon. After pouring the powder into the mold, the mold was encapsulated and the powder was consolidated at 60,000 psi. Green density of the 4.7"×15.9"×53.5" pre-forms was 70±15% of theoretical. The pre-form was placed into the vacuum sintering furnace and sintered at 1200° C. using a special, three-step sintering cycle. Firstly, heating was done at the initial dehydrogenation temperature of up to 400° C., using special furnace fixtures for the removal of the emitted hydrogen. Then, heating was carried out to those temperatures where the complete removal of hydrogen was taking place, 700° C., holding at this temperature for a time equal to the thickness of the cross-section in inches multiplied by 30 minutes. Then, the compacted titanium hydride article was sintered at 1200±20° C. for 4 hours. All heating-cooling steps were carried out under argon, manufacturing oxygen-free green articles before sintering.

The sintered titanium pre-form was cooled to room temperature and analyzed for size, density, chemistry, microstructure, and other properties. The pre-form shrunk during sintering to the size of 4.6"×15.4"×52.4", the material exhibited near full density and met the chemistry and property specifications for C. P. Titanium Grade 2. The content of impurities in the titanium were measured by standard methods: oxygen<1600 ppm, iron<200 ppm, magnesium<50 ppm, chlorine<15 ppm, sodium<10 ppm, and hydrogen<50 ppm. A small rectangular plate was cut from the pre-form, hot rolled at 800° C., and annealed. The alloy was tensile tested and exhibited 69 ksi of Ultimate Tensile Strength, 60 ksi of Yield Strength, and 20% of Elongation.

Example 2

The titanium hydride powder alloyed with aluminum and vanadium was manufactured, according to an embodiment of the invention, using the following raw materials, gases, and metal halogen compounds:

titanium tetrachloride as a source of titanium,
metallic magnesium as a reducing agent,
hydrogen as a reactive shielding atmosphere and reducing agent,
titanium hydride powder $TiH_2$ as an additional source of titanium and as a source of atomic hydrogen, at the same time,
powder of aluminum chloride $AlCl_3$ as a source of aluminum, and
liquid vanadium chloride $VCl_4$ as a source of vanadium.

The amounts of precursor salts $TiCl_4$, $AlCl_3$ and $VCl_4$ were calculated, and experimentally adjusted to provide for a product composition with a Ti-6Al-4V alloy having a low content of oxygen.

The process included the following steps:

(a) Metallic magnesium was melted and poured into the retort, then hydrogen gas was supplied to the magnesium mirror at 750° C. The system was held for 16 min for the dissolution of the hydrogen into the liquid magnesium up to saturation;

(b) Liquid titanium tetrachloride $TiCl_4$ was supplied from an inlet pipe into the retort filled with the liquid magnesium, and the magnesium-thermic reaction was started, producing metallic titanium sponge and magnesium chloride as a byproduct;

(c) Titanium hydride powder, as well as aluminum chloride and vanadium chloride precursor salts, were introduced into the retort, together with liquid titanium tetrachloride $TiCl_4$ in the form of a pulp. The amount of titanium hydride powder was 1.6 kg, or 1 wt. % of the titanium product weight to be produced from the titanium tetrachloride for the whole processing cycle;

When particles of the pulp containing titanium hydride powder reached the liquid magnesium mirror, they were immersed in the bath of liquid metallic magnesium and magnesium chloride phases in the retort. The titanium hydride particles immediately started emitting atomic hydrogen, and initiated convective flows in the liquid phases, enhancing the reduction of $TiCl_4$, $AlCl_3$, and $VCl_4$ by the magnesium. Also, active nuclei were formed on the surface of the titanium hydride particles, followed by their raising up and then submerging to the retort bottom;

(d) Hydrogen gas micro-bubbles were formed due to the dissociation of the titanium hydride into titanium and hydrogen at 750° C. These bubbles had diameters of about 0.01-3.0 mm;

The reduction of the titanium tetrachloride $TiCl_4$, $AlCl_3$, and $VCl_4$ was carried out not only with liquid magnesium, but also by purging additional gaseous hydrogen through the liquid magnesium and magnesium chloride layers. Together with the hydrogen gas being emitted from the titanium hydride powder, the supplied hydrogen reacted with the titanium tetrachloride $TiCl_4$. This produced a solid phase of titanium trichloride $TiCl_3$, which when it contacted the liquid magnesium, was reduced to titanium both on the magnesium bath surface, and in the liquid magnesium, at a depth of 1-100 mm, or deeper. Aluminum- and vanadium chlorides were reduced to metallic aluminum and vanadium, the alloying elements to be used in the sintering step;

(e) At the same time, hydrogen was dissolved into the reduced titanium, aluminum, and vanadium metals at the end of the reduction reaction at 750° C., in an amount of up to 100 $cm^3$ of hydrogen per 1 g of titanium. This formed a sponge-like titanium-aluminum-vanadium hydride that contained both simple hydrides $TiH_{0.3}$, VH, and complex hydride compounds like $(Ti, Al, V)H_x$;

(f) After the titanium-aluminum-vanadium hydride sponge block was formed, it was subjected to vacuum separation at 1010±10° C., this emitted additional hydrogen from the titanium hydride. This additional atomic hydrogen enhanced the removal of any residual magnesium and magnesium chloride from the sponge block's pores. Besides, the temperature of the sponge block decreased due to the heat of the evaporation of magnesium metal and magnesium chloride, and because of the endothermic transformation $TiH_x \rightarrow Ti$. This was accompanied by the homogenization of the titanium hydride alloyed with aluminum and vanadium incorporated earlier in the forms of metals and hydrides;

(g) Additional cold hydrogen was supplied into the retort at a pressure of about 1 bar (1 atm), following the removal of a main part of the magnesium and magnesium chloride, which was removed when the temperature in the center of the retort went down from 1000° C. to 600° C. Significant thermal stresses appeared in the sponge block due to its polymorphic transformation and the additional hydrogenation of titanium to $TiH_2$ and the crystallization of magnesium and magnesium chloride below the sponge block. These stresses broke the walls containing and surrounding the sponge block's pores, and previously closed pores opened up, improving conditions for vacuum separation;

(h) Once the sponge block had cooled, a full crystallization of metallic magnesium and magnesium chloride occurred, and additional stresses appeared within the titanium-aluminum-vanadium hydride sponge block, causing the partial disintegration of the sponge. This effect improved evaporation and eased the removal of magnesium and magnesium chloride during the second step of vacuum separation;

(i) The temperature of the metal hydride sponge block was again raised up to 1000° C. in the center of the retort, as described in Example 1. When the temperature of the sponge block reached 1000° C., the hydrogen gas supply was stopped, and vacuum pumps were turned on to provide a vacuum in the retort, and to accomplish the second, final step of vacuum separation. Both the magnesium and magnesium chloride were completely removed from the titanium hydride sponge;

(j) Then, the sponge block was de-hydrogenated in the vacuum, at 1000° C., and the temperature went down. When the temperature reached 600° C. and continued to go down, the process of de-hydrogenation was switched to hydrogenation, by supplying gaseous hydrogen again. Both the thermal stresses and the appearance of the new hydride phases promoted the destruction of the sponge block's closed pores, helping to free magnesium and magnesium chloride for their evaporation. Thus, the temperature parameters of steps (g) to (j) decreased the total time of separation. This decrease resulted because of structural changes in the lattices that occurred during phase transformation and affected the bulk densities of the new compositions, (k) After vacuum separation was completed, the sponge block had cooled to room temperature in the hydrogen atmosphere. This was carried out by permanently purging hydrogen through the retort. The cooling process was accompanied by the additional destruction of the sponge block's closed pores due to the additional stresses initiated by the density differences between the liquid and solid phases, and (l) Using a rotary cutter, the cold titanium-aluminum-vanadium hydride sponge block was mechanically disintegrated directly into the retort, under a protective argon atmosphere. The ratio of the cutter diameter $D_C$ to the inner diameter of the retort $D_R$ was about 0.94. The resulting particles of titanium-aluminum-vanadium hydride powder had a particle size in the range of 70-600 microns. The content of hydrogen in the complex hydride powder was in the range of 2.0-2.5 wt. %, after hydrogenation during the process of cooling in a hydrogen atmosphere according to step (k).

The inner surface of the retort was covered by tantalum sheets, which prevented the contamination of the resulting alloyed titanium hydride powder from the iron, nickel, and chromium of the retort material. The resulting alloyed titanium hydride powder was replaced from the retort by pneumatic transport, using argon, followed by packing the powder into drums without any contact with air.

The complex titanium-aluminum-vanadium hydride powder was handled in a protective argon atmosphere, prior to room temperature consolidation, by die pressing at a 50 tsi pressure. The green compact exhibited about 75% of the theoretical density. The green compact was also handled in an argon atmosphere prior to placing it into the vacuum furnace for sintering. The pre-form was placed into the vacuum sintering furnace and was sintered at 1250° C., using a special, three-step sintering cycle. Firstly, heating was done to an initial dehydrogenation temperature of up to 350° C., using special furnace fixtures to remove the emitted hydrogen. Then, heating was carried out to temperatures where the complete removal of hydrogen would take place, 750° C., holding at this temperature for the time equal to the thickness of the cross-section in inches multiplied by 30 minutes. Then, the compacted titanium hydride article was sintered at 1250±20° C. for 4 hours. All of the heating-cooling steps were carried out under argon to manufacture the oxygen-free green articles before sintering. The sintered titanium alloy Ti-6Al-4V article was cooled to a temperature of 750° C. and subjected to one-run of hot rolling at a thickness reduction ratio of 4. The thickness of the titanium hot-rolled sheet was about 24 mm. The content of impurities in the titanium alloy was the following: oxygen≤1500 ppm, iron<600 ppm, magnesium<10 ppm, chlorine<10 ppm, sodium<10 ppm, and hydrogen<50 ppm. The mechanical properties of this powder metallurgy (PM) Ti-6Al-4V alloy exhibited superior properties, meeting and exceeding the properties of ingot metallurgy wrought products. The PM alloy exhibited 149 ksi of Ultimate Tensile Strength, 135 ksi of Yield Strength and 18% of Elongation.

Example 3

The pure titanium hydride powder was manufactured, according to an embodiment of the invention, with an additional supply of gaseous hydrogen, using the following raw materials, chemicals, and gases:
titanium tetrachloride as a source of titanium,
metallic magnesium as a reducing agent,
hydrogen as a reactive shielding atmosphere and as a reducing agent, and
titanium hydride powder $TiH_2$ as an additional source of titanium and also as a source of atomic hydrogen.

The process was carried out with the same components and procedures as in Example 1, but some parameters (such as the temperatures, timing, hydrogen supply, amounts of titanium hydride powder, etc.) were changed. The process included the following steps:

(a) Metallic magnesium was melted and poured into the retort at 800° C.;

(b) Liquid titanium tetrachloride $TiCl_4$ was supplied from an inlet pipe into the retort filled with liquid magnesium, and the magnesium-thermic reaction was started, producing a metallic titanium sponge and magnesium chloride as a byproduct of this reaction;

(c) Titanium hydride powder was introduced into the retort together with liquid titanium tetrachloride $TiCl_4$, in the form of a pulp, followed by supplying hydrogen gas. The system was held for 10 min, to allow for the dissolution of the hydrogen into the liquid magnesium up to saturation. The amount of titanium hydride powder was 3.2 kg, or 2 wt. % of the titanium product weight to be produced from the titanium tetrachloride for the whole processing cycle;

When the particles of the titanium hydride powder reached the liquid magnesium mirror, they were immersed in the bath of liquid metallic magnesium and magnesium chloride phases in the retort. These solid particles immediately started to emit atomic hydrogen, and initiated convective flows in the liquid phases, enhancing the reduction of $TiCl_4$ by the magnesium. Also, active nuclei were formed on the surface of the titanium hydride particles, followed by their raising up and then immersing to the retort bottom;

(d) Hydrogen gas micro-bubbles formed due to the dissociation of the titanium hydride into titanium and hydrogen at 800° C. These bubbles had diameters ranging from 0.01 mm to about 5.0 mm. The bubbling increased the rate of the reduction process by increasing the effective surface of the reacting phases by up to 500%. Also, they destroyed the magnesium chloride film on the surface of the molten magnesium, and generated a turbulent gas phase above the liquid in the retort;

The reduction of titanium tetrachloride $TiCl_4$ was carried out not only with liquid magnesium, but also by purging additional gaseous hydrogen through the liquid magnesium and magnesium chloride layers. Together with the hydrogen gas being emitted from the titanium hydride powder, the supplied hydrogen reacted with the titanium tetrachloride $TiCl_4$. This produced a solid phase of titanium trichloride $TiCl_3$, which when it contacted the liquid magnesium, was reduced to titanium both on the magnesium bath surface, and in the liquid magnesium, at a depth of 1-100 mm, or deeper;

(e) At the same time, hydrogen was dissolved into the reduced titanium metal, at the end of the reduction reaction at 800° C., in an amount of up to 120 cm³ of hydrogen per 1 g of titanium. This formed a sponge-like titanium hydride that had a composition of about $TiH_x$, where x is in the range of 0.3-1, for example, $TiH_{0.5}$;

(f) After the titanium hydride sponge block was formed, it was subjected to vacuum separation at 1000±10° C., this emitted additional hydrogen from the titanium hydride. This additional atomic hydrogen enhanced the removal of any residual magnesium and magnesium chloride from the sponge block's pores. Besides, the temperature of the sponge block decreased due to the heat of the evaporation of magnesium metal and magnesium chloride, and because of the endothermic transformation $TiH_x \rightarrow Ti$;

(g) The retort was cooled from the outside while additional cold hydrogen was supplied into the retort, at a pressure of about 1 bar (1 atm), following the removal of a main part of magnesium and magnesium chloride, which was removed when the temperature in the center of the retort went down from 1000° C. to 600° C. Significant thermal stresses appeared in the sponge block due to its polymorphic transformation, the additional hydrogenation of titanium to $TiH_2$, and the crystallization of magnesium and magnesium chloride below the sponge block. These stresses broke the walls of the sponge block's pores, and previously closed pores opened up, improving conditions for vacuum separation;

(h) Once the sponge block had cooled, a full crystallization of metallic magnesium and magnesium chloride occurred, and additional stresses appeared within the titanium hydride sponge block, causing the partial disintegration of the sponge. This effect improved evaporation and eased the removal of magnesium and magnesium chloride during the second step of vacuum separation;

(i) The temperature of the metal hydride sponge block was again raised up to 1000° C. in the center of retort, due to high thermal conductivity of the supplied hydrogen, cutting the total time of separation upon the heat transfer. When the temperature of the sponge block reached 1000° C., the hydrogen gas supply was stopped, and vacuum pumps were turned on to provide a vacuum in the retort and to accomplish the second, final step of vacuum separation. Both the magnesium and magnesium chloride were completely removed from the titanium hydride sponge;

(j) Then, the sponge block was de-hydrogenated at 1000° C., and the temperature went down. When the temperature reached 600° C. and continued to go down, the process of de-hydrogenation was switched to hydrogenation, by supplying hydrogen gas again, (k) After vacuum separation was completed, the sponge block had cooled to room temperature in the hydrogen atmosphere. This was carried out by permanently purging hydrogen through the retort. The cooling process was accompanied by the additional destruction of the sponge block's closed pores due to additional stresses initiated by the density differences between titanium phases containing different amounts of hydrogen in their crystal lattices, and (l) Using a rotary cutter, the cold titanium hydride sponge block was mechanically disintegrated immediately into the retort, under a protective argon atmosphere. The ratio of the cutter diameter $D_c$ to the inner diameter of the retort $D_R$ is about 0.92. The resulting particles of titanium hydride $TiH_2$ powder had a particle size in the range of 10-600 microns. The content of hydrogen in $TiH_2$ powder was in the range of 3.60-3.70 wt. %, after hydrogenation during the process of cooling in the hydrogen atmosphere according to step (l).

The inner surface of the retort was covered by molybdenum sheets, which prevented the contamination of the resulting titanium hydride powder from the iron, nickel, and chromium of the retort material. The resulting titanium hydride powder was replaced from the retort by pneumatic transport, using argon, followed by packing the powder into drums without any contact with air.

Cold Isostatic Pressing of 570 lbs of powder was formed in an argon filled rubber mold. After pouring the powder into the mold, the mold was encapsulated and cold-isostatic pressure was consolidated at 60,000 psi. The green density of the 4.7"×15.9"×53.5" pre-forms was 70±15% of the theoretical amount. The pre-form was placed into the vacuum sintering furnace and sintered at 1300° C. using a special, three-step sintering cycle. Firstly, heating was done at the initial dehydrogenation temperature, up to 450° C., using special furnace fixtures for the removal of the emitted hydrogen. Then, heating was carried out to those temperatures where the complete removal of hydrogen took place, 650° C., holding at this temperature for a time equal to the thickness of cross-section in inches multiplied by 30 minutes. Then, the compacted titanium hydride article was sintered at 1300±20° C. for 4 hours. All heating-cooling steps were carried out under argon, manufacturing oxygen-free, green articles before sintering.

A round sample was cut off from the pre-form and was subjected to a room temperature, flow forming operation in order to produce the tubing. The flow formed materials exhibited very high strength: 110 ksi of Ultimate Tensile Strength, 94 ksi of Yield Strength at excellent ductility (16% of Elongation) in as deformed conditions (not annealed).

Example 4

The alloyed titanium hydride powder was manufactured, according to the invention, using the following raw materials, gases, and chemicals, including aluminum chloride as the only alloying metal halogen compound:
titanium tetrachloride as a source of titanium,
metallic magnesium as a reducing agent,
hydrogen as a reactive shielding atmosphere and as a reducing agent,
titanium hydride powder $TiH_2$, as an additional source of titanium and as a source of atomic hydrogen, and
powder of aluminum chloride $AlCl_3$ as a source of aluminum.

The amounts of precursor salts $TiCl_4$ and $AlCl_3$ were calculated and experimentally adjusted to provide for the product composition of the low-oxygen alloy Ti-5Al.

The process included the following steps:

(a) Metallic magnesium was melted and poured into the retort, then hydrogen gas was supplied to the magnesium mirror at 780° C. The system was held for 14 min, to allow for the dissolution of hydrogen into the liquid magnesium up to saturation;

(b) Liquid titanium tetrachloride $TiCl_4$ was supplied from an inlet pipe into the retort filled with liquid magnesium, and the magnesium-thermic reaction was started, producing a metallic titanium sponge and magnesium chloride as a byproduct of this reaction;

(c) Titanium hydride powder, as well as aluminum chloride precursor salt, were introduced into the retort, together with liquid titanium tetrachloride $TiCl_4$, in the form of a pulp. The amount of titanium hydride powder was 6.4 kg, or 4 wt. % of the titanium product weight to be produced from the titanium tetrachloride for the whole processing cycle;

When the particles of the pulp containing titanium hydride and aluminum chloride powders reached the liquid magnesium mirror, they were immersed in the bath of liquid metallic magnesium and magnesium chloride phases in the retort. The titanium hydride particles immediately started to emit atomic hydrogen, and initiated convective flows in the liquid phases, enhancing the reduction of $TiCl_4$ and $AlCl_3$ by the magnesium. Also, active nuclei were formed on the surface of the titanium hydride particles, followed by their raising up and then immersing to the retort bottom;

(d) Hydrogen gas micro-bubbles formed due to the dissociation of the titanium hydride into titanium and hydrogen at 780° C. These bubbles had diameters in the range of 0.01-3.5 mm;

The reduction of the titanium tetrachloride $TiCl_4$ and $AlCl_3$ was carried out not only with liquid magnesium, but also by purging additional gaseous hydrogen through the liquid magnesium and magnesium chloride layers. Together with the hydrogen gas being emitted from the titanium hydride powder, the supplied hydrogen reacted with the titanium tetrachloride $TiCl_4$. This produced a solid phase of titanium trichloride $TiCl_3$, which, when it contacted the liquid magnesium, was reduced to titanium both on the magnesium bath surface, and in the liquid magnesium, at a depth of 1-100 mm, or deeper. The aluminum chloride was reduced to metallic aluminum, which would be an alloying element in the sintering step;

(e) At the same time, hydrogen was dissolved into the reduced titanium and aluminum metals, at the end of the reduction reaction at 780° C., in an amount of up to 120 cm$^3$ of hydrogen per 1 g of titanium. This formed a sponge-like titanium-aluminum hydride that contained both simple hydrides TiH$_{0.5}$, and complex hydride compounds like (Ti, Al)H$_x$;

(f) After the titanium-aluminum hydride sponge block was formed, it was subjected to vacuum separation at 1020±10° C., this emitted additional hydrogen from the titanium hydride. This additional atomic hydrogen enhanced the removal of any residual magnesium and magnesium chloride from the sponge block's pores. Besides, the temperature of the sponge block decreased due to the heat of the evaporation of magnesium metal and magnesium chloride, and because of the endothermic transformation TiH$_x$→Ti. This was accompanied by the homogenization of the titanium hydride alloyed with aluminum introduced earlier in the forms of metals and hydride compounds;

(g) Additional cold hydrogen was supplied into the retort, at a pressure of about 1 bar (1 atm), following the removal of a main part of magnesium and magnesium chloride, which was removed when the temperature in the center of the retort went down from 1020° C. to 620° C. Significant thermal stresses appeared in the sponge block due to its polymorphic transformation, the additional hydrogenation of titanium to TiH$_2$, and the crystallization of magnesium and magnesium chloride below the sponge block. These stresses broke the walls of the sponge block's pores, and closed pores opened up, improving conditions for vacuum separation;

(h) Once the sponge clock had cooled, a full crystallization of metallic magnesium and magnesium chloride occurred, and additional stresses appeared within the titanium-aluminum hydride sponge block, causing the partial disintegration of the sponge. This effect improved evaporation and eased the removal of magnesium and magnesium chloride during the second step of vacuum separation;

(i) The temperature of the metal hydride sponge block was again raised up to 1020° C. in the center of the retort. When the temperature of the sponge block reached 1020° C., the hydrogen gas supply was stopped, and vacuum pumps were turned on to provide a vacuum in the retort and to accomplish the second, final step of vacuum separation. Both the magnesium and magnesium chloride were completely removed from the titanium hydride sponge;

(j) Then, the sponge block was de-hydrogenated in the vacuum, at 1020° C., and the temperature went down. When the temperature reached 620° C. and continued to go down, the process of de-hydrogenation was switched to hydrogenation, by supplying hydrogen gas again, (k) After vacuum separation was completed, the sponge block had cooled to room temperature in the hydrogen atmosphere. This was carried out by permanently purging hydrogen through the retort. The cooling process was accompanied by the additional destruction of the sponge block's closed pores due to additional stresses initiated by the density differences between the liquid and solid phases, and (1) Using a rotary cutter, the cold titanium-aluminum hydride sponge block was mechanically disintegrated immediately into the retort, under a protective hydrogen atmosphere. The ratio of the cutter diameter $D_C$ to the inner diameter of the retort $D_R$ was about 0.92. The resulting particles of titanium-aluminum hydride powder had a particle size in the range 70-600 microns. The content of hydrogen in the complex hydride powder was in the range of 2.5-3.0 wt. %, after hydrogenation during the process of cooling in a hydrogen atmosphere according to step (k).

The inner surface of the retort was covered by niobium sheets, which prevented the contamination of the resulting alloyed titanium hydride powder from the iron, nickel, and chromium of the retort material. The resulting alloyed titanium hydride powder was removed from the retort by pneumatic transport, using argon, followed by packing the powder into drums without any contact with air.

Cold compaction of the complex titanium-aluminum hydride powder was also carried out under argon to manufacture oxygen-free, green articles before sintering. The preform was placed into the vacuum sintering furnace and sintered at 1300° C. using a special, three-step sintering cycle.

Firstly, heating was done to the initial dehydrogenation temperature at up to 420° C., using special furnace fixtures to remove the emitted hydrogen. Followed by heating to the temperatures where the complete removal of hydrogen took place at 720° C., holding at this temperature for the time equal to the thickness of the cross-section in inches multiplied by 30 minutes. Then, the compacted titanium hydride article was sintered at 1300±20° C. for 4 hours. All of the heating-cooling steps were carried out under argon, manufacturing oxygen-free, green articles before sintering.

The sintered titanium alloy Ti-5Al article was cooled to a temperature of 950° C. and was subjected to one-run of hot rolling at a thickness reduction ratio of 4. The thickness of the titanium hot-rolled sheet was about 25 mm.

Example 5

The alloyed titanium hydride powder was manufactured, according to an embodiment of the invention, using a master alloy powder for alloying the titanium hydride. No alloying metal halogens were added. The following raw materials, chemicals, and gases were used:
  titanium tetrachloride as a source of titanium,
  metallic magnesium as a reducing agent,
  hydrogen as a reactive shielding atmosphere and as a reducing agent,
  titanium hydride powder TiH$_2$ as an additional source of titanium and as a source of atomic hydrogen,
  powder of aluminum-vanadium master alloy Al-40V, containing 60 wt. % of the aluminum and 40 wt. % of the vanadium. The amount of the master alloy was calculated and experimentally adjusted to provide for the product composition of the Ti-6Al-4V alloy.

The process included the following steps:

(a) Metallic magnesium was melted and poured into the retort, then hydrogen gas was supplied to the magnesium mirror at 850° C. The system was held for 10 min, to allow for the dissolution of the hydrogen into the liquid magnesium up to saturation;

(b) Liquid titanium tetrachloride TiCl$_4$ was supplied from an inlet pipe into the retort filled with liquid magnesium, and the magnesium-thermic reaction was started, producing a metallic titanium sponge and magnesium chloride as a byproduct of this reaction;

(c) Titanium hydride powder, as well as aluminum-vanadium master alloy, were introduced into the retort, together with liquid titanium tetrachloride TiCl$_4$, in the form of a pulp. The amount of titanium hydride powder was 8 kg, or 5 wt. % of the titanium product weight to be produced from the titanium tetrachloride for the whole processing cycle;

When the particles of the pulp containing titanium hydride powder reached the liquid magnesium mirror, they were immersed in the bath of liquid metallic magnesium and magnesium chloride phases in the retort. The titanium hydride particles immediately started to emit atomic hydrogen, and initiated convective flows in the liquid phases, enhancing the reduction of TiCl$_4$ by the magnesium. Also, active nuclei were formed on the surface of titanium hydride particles, followed by their raising up and then immersing to the retort bottom;

(d) Hydrogen gas micro-bubbles formed due to the dissociation of the titanium hydride into titanium and hydrogen at 850° C. These bubbles had diameters in the range of 0.01-5.0 mm;

The reduction of the titanium tetrachloride TiCl$_4$ was carried out not only with liquid magnesium, but also by purging additional gaseous hydrogen through the liquid magnesium and magnesium chloride layers. Together with the hydrogen gas being emitted from the titanium hydride powder, the supplied hydrogen reacted with the titanium tetrachloride TiCl$_4$. This produced a solid phase of titanium trichloride TiCl$_3$, which when it contacted the liquid magnesium, was reduced to titanium both on the magnesium bath surface, and in the liquid magnesium, at the depth of 1-100 mm, or deeper. The aluminum-vanadium master alloy started to dissolve in both the titanium hydride and in the reduced titanium;

(e) At the same time, hydrogen was dissolved into the reduced titanium and into the master alloy, at the end of the reduction reaction at 850° C., in an amount of up to 80 cm$^3$ of hydrogen per 1 g of titanium alloy. This formed a sponge-like titanium-aluminum-vanadium hydride that contained both simple hydrides TiH$_{0.5}$, and complex hydride compounds like (Al, V)H$_x$ and (Ti, Al, V)H$_x$;

(f) After the titanium-aluminum-vanadium hydride sponge block was formed, it was subjected to vacuum separation at 1050±10° C., which emitted additional hydrogen from the titanium hydride. This additional atomic hydrogen enhanced the removal of any residual magnesium and magnesium chloride from the sponge block's pores. In addition, the temperature of the sponge block decreased due to the heat of the evaporation of magnesium metal and magnesium chloride, and because of the endothermic transformation TiH$_x$→Ti. This was accompanied by the homogenization of the titanium hydride alloyed with aluminum and vanadium introduced earlier in the forms of metals and hydrides;

(g) Additional cold hydrogen was supplied into the retort, at a pressure of about 1 bar (1 atm), following the removal of a main part of magnesium and magnesium chloride, which was removed when the temperature in the center of the retort went down from 1050° C. to 640° C. Significant thermal stresses appeared in the sponge block due to its polymorphic transformation, the additional hydrogenation of titanium to TiH$_2$, and the crystallization of magnesium and magnesium chloride below the sponge block. These stresses broke the walls of the sponge block's pores, and previously closed pores opened up, improving conditions for vacuum separation;

(h) Once the sponge block had cooled, a full crystallization of metallic magnesium and magnesium chloride occurred, and additional stressed appeared within the titanium-aluminum-vanadium hydride sponge block, causing the partial disintegration of the sponge. This improved evaporation and eased the removal of magnesium and magnesium chloride during the second step of vacuum separation;

(i) The temperature of the metal hydride sponge block was again raised up to 1050° C. in the center of the retort as in Example 2. When the temperature of the sponge block reached 1050° C., the hydrogen gas supply was stopped, and vacuum pumps were turned on to provide a vacuum in the retort, and to accomplish the second, final step of vacuum separation. Both the magnesium and magnesium chloride were completely removed from the titanium hydride sponge;

(j) Then, the sponge block was de-hydrogenated in the vacuum at 1050° C., and the temperature went down. When the temperature reached 640° C. and continued to go down, the process of de-hydrogenation was switched to hydrogenation, by supplying hydrogen gas again.

(k) After vacuum separation was completed, the sponge block was cooled to room temperature in the hydrogen atmosphere by the process of permanently purging hydrogen through the retort. The cooling process was accompanied by the additional destruction of the sponge block's closed pores due to the additional stresses initiated by the difference in density between the liquid and solid phases, and (l) Using a rotary cutter, the cold titanium-aluminum-vanadium hydride sponge block was mechanically disintegrated immediately into the retort, under a protective hydrogen atmosphere. The ratio of the cutter diameter D$_C$ to the inner diameter of the retort D$_R$ was about 0.92. The resulting particles of titanium-aluminum-vanadium hydride powder had a particle size in the range 70-600 microns. The content of hydrogen in the complex hydride powder was in the range of 2.8-3.5 wt. %, after hydrogenation during the process of cooling in hydrogen atmosphere according to step (k).

The inner surface of the retort was covered by tantalum sheets, which prevented the contamination of the resulting alloyed titanium hydride powder from the iron, nickel, and chromium of the retort material. The resulting alloyed titanium hydride powder was removed from the retort by pneumatic transport, using argon, followed by packing the powder into drums without any contact with air.

Cold compaction of the complex titanium-aluminum-vanadium hydride powder was performed in a Cold Isostatic Press, under the same conditions as described in Example 1, but we molded 3" diameter×50" long bars. These bars were extruded in an alpha-beta region (950° C.), annealed and tested for tensile and fatigue properties, the results obtained are shown in the Tables below. The properties of the powder metallurgy alloy produced by the invented process are equal to or better than those of processed wrought ingot metallurgy alloys of the identical chemical composition.

| Room Temperature Tensile Testing | | | |
| --- | --- | --- | --- |
| Ti—6Al—4V | Ultimate Tensile Strength, ksi | Yield Strength, ksi | Elongation, % |
| Baseline (ingot) | 144.1-149.8 | 140.7-143.7 | 19.4-21.2 |
| ADMA P/M Extruded | 148.3-151.6 | 142.7-145.1 | 19.8-22.8 |
| AMS 4928R | 135 Min. | 125 Min. | 10 Min. |

| Fatigue Test Results | | | | |
| --- | --- | --- | --- | --- |
| Ti—6Al—4V | Maximum Load (lb) | Maximum Stress (ksi) | Cycles to Failure | Diameter (in) |
| Baseline (ingot) | 5880 | 119 | 1,014,725 | 0.251 |
| ADMA P/M Extruded | 5880 | 119 | 3,716,462 | 0.250 |

All heating-cooling steps were also carried out under argon to manufacture oxygen-free, green articles before sintering. Then, the compacted green article was placed under argon protection into a stainless steel capsule which was outgassed to a vacuum of 10$^{-2}$ Pa. The capsule with the green article was placed in an electric furnace, where it was sintered at 1250±20° C. The sintered titanium alloy Ti-6Al-4V article was cooled to room temperature.

Example 6

The alloyed titanium hydride powder was manufactured, according to an embodiment of the invention, using a mixture of individual aluminum and vanadium powders instead of a master alloy as applied in Example 5. No halogens of alloying components were added. The following raw materials, chemicals, and gases were used:

titanium tetrachloride as a source of titanium,
metallic magnesium as a reducing agent,
hydrogen as a reactive shielding atmosphere and as a reducing agent,
titanium hydride powder $TiH_2$ as an additional source of titanium and as a source of atomic hydrogen,
individual aluminum powder and vanadium powder at the ratio of 60 wt. % of the aluminum powder and 40 wt. % of the vanadium powder. The amounts of these powders were calculated and experimentally adjusted to provide for the product composition of the Ti-6Al-4V alloy.

The process included the following steps:

(a) Metallic magnesium was melted and poured into the retort, then hydrogen gas was supplied to the magnesium mirror at 850° C. The system was held for 10 min, to allow for the dissolution of the hydrogen into the liquid magnesium up to saturation;

(b) Liquid titanium tetrachloride $TiCl_4$ was supplied from an inlet pipe into the retort filled with liquid magnesium, and the magnesium-thermic reaction was started, producing a metallic titanium sponge and magnesium chloride as a byproduct of this reaction;

(c) Titanium hydride powder, as well as aluminum and vanadium powders, were introduced into the retort, together with liquid titanium tetrachloride $TiCl_4$, in the form of a pulp. The amount of titanium hydride powder was 16 kg, or 10 wt. % of the titanium product weight to be produced from the titanium tetrachloride for the whole processing cycle;

When the particles of the pulp containing titanium hydride powder reached the liquid magnesium mirror, they were immersed in the bath of liquid metallic magnesium and magnesium chloride phases in the retort. The titanium hydride particles immediately started to emit atomic hydrogen, and initiated convective flows in the liquid phases, enhancing the reduction of $TiCl_4$ by the magnesium. Also, active nuclei were formed on the surface of titanium hydride particles, followed by their raising up and then immersing to the retort bottom;

(d) Hydrogen gas micro-bubbles formed due to the dissociation of the titanium hydride into titanium and hydrogen at 850° C. These bubbles had diameters in the range of 0.01-5.0 mm;

The reduction of the titanium tetrachloride $TiCl_4$ was carried out not only with liquid magnesium, but also by purging additional gaseous hydrogen through the liquid magnesium and magnesium chloride layers. Together with the hydrogen gas being emitted from the titanium hydride powder, the supplied hydrogen reacted with the titanium tetrachloride $TiCl_4$. This produced a solid phase of titanium trichloride $TiCl_3$, which when it contacted the liquid magnesium, was reduced to titanium both on the magnesium bath surface, and in the liquid magnesium, at the depth of 1-100 mm, or deeper. The aluminum and vanadium started to dissolve in both the titanium hydride and in the reduced titanium;

(e) At the same time, hydrogen was dissolved into the reduced titanium, and in the alloying powder, at the end of the reduction reaction at 850° C., in an amount of up to 110 cm³ of hydrogen per 1 g of titanium alloy. This formed a sponge-like titanium-aluminum-vanadium hydride that contained both simple hydrides $TiH_{0.5}$, VH, and complex hydride compounds like $(Al, V)H_x$ and $(Ti, Al, V)H_x$;

(f) After the titanium-aluminum-vanadium hydride sponge block was formed, it was subjected to vacuum separation at 1050±10° C., this emitted additional hydrogen from the titanium hydride. This additional atomic hydrogen enhanced the removal of any residual magnesium and magnesium chloride from the sponge block's pores. Besides, the temperature of the sponge block decreased due to the heat of the evaporation of magnesium metal and magnesium chloride, and because of the endothermic transformation $TiH_x \rightarrow Ti$. This was accompanied by the homogenization of the titanium hydride alloyed with aluminum and vanadium in the forms of metals and hydrides;

(g) Additional cold hydrogen was supplied into the retort, at a pressure of about 1 bar (1 atm), following the removal of a main part of magnesium and magnesium chloride, which was removed when the temperature in the center of the retort went down from 1050° C. to 640° C. Significant thermal stresses appeared in the sponge block due to its polymorphic transformation, the additional hydrogenation of titanium to $TiH_2$, and the crystallization of magnesium and magnesium chloride below the sponge block. These stresses broke the walls of the sponge block's pores, and previously closed pores opened up, improving conditions of vacuum separation;

(h) Once the sponge block had cooled, a full crystallization of metallic magnesium and magnesium chloride occurred, and additional stresses appeared within the titanium-aluminum-vanadium hydride sponge block, causing the partial disintegration of the sponge. This improved evaporation and eased the removal of magnesium and magnesium chloride during the second step of vacuum separation;

(i) The temperature of the metal hydride sponge block was again raised up to 1050° C. in the center of the retort, as in Example 2. When the temperature of the sponge block reached 1050° C., the hydrogen gas supply was stopped, and vacuum pumps were turned on to provide a vacuum in the retort, and to accomplish the second, final step of vacuum separation. Both the magnesium and magnesium chloride were completely removed from the titanium hydride sponge;

(j) Then, the sponge block was de-hydrogenated in the vacuum, at 1050° C., and the temperature went down. When the temperature reached 640° C. and continued to go down, the process of de-hydrogenation was switched to hydrogenation, by supplying hydrogen gas again.

(k) After vacuum separation was completed, the sponge block was cooled to room temperature in the hydrogen atmosphere. This was carried out by permanently purging hydrogen through the retort. The cooling process was accompanied by the additional destruction of the sponge block's closed pores due to additional stresses initiated by the density differences between the liquid and solid phases, and (l) Using a rotary cutter, the cold titanium-aluminum-vanadium hydride sponge block was mechanically disintegrated immediately into the retort, under a protective argon atmosphere. The ratio of the cutter diameter $D_C$ to the inner diameter of the retort $D_R$ was about 0.92. The resulting particles of titanium-aluminum-vanadium hydride powder had a particle size in the range 70-600 microns. The content of hydrogen in the complex hydride powder was in the range of 3.0-3.5 wt. %, after hydrogenation during the process of cooling in a hydrogen atmosphere according to step (k).

The inner surface of the retort was covered by tantalum sheets, which prevents the contamination of the resulting alloyed titanium hydride powder from the iron, nickel, and chromium of the retort material. The resulting alloyed titanium hydride powder was removed from the retort by pneumatic transport, using argon, followed by packing the powder into drums without any contact with air.

Cold compaction of the complex titanium-aluminum-vanadium hydride powder was performed in a die using mechanical press. The molding pressure was 50 tsi. The green density of the 4.7"×15.9"×53.5" pre-forms was at 70±15% of the theoretical amount. The pre-form was placed into the vacuum sintering furnace and sintered at 1300° C., using a special, three-step sintering cycle. Firstly, heating was done to the initial dehydrogenation temperature of up to 375° C., using special furnace fixtures to remove the emitted hydrogen. This was followed by heating to the temperatures where the complete removal of hydrogen took place at 700° C., holding at this temperature for the time equal to the thickness of the cross-section in inches multiplied by 30 minutes. Then, the compacted titanium hydride article was sintered at 1300±20° C. for 4 hours. All of the heating-cooling steps were carried out under argon, manufacturing oxygen-free, green articles before sintering.

The as sintered samples were tensile tested and exhibited the following properties: Ultimate Tensile Strength 135 ksi, Yield Strength 125 ksi, and Elongation 10%.

Example 7

This Example demonstrates the application of an individual metal powder other than aluminum and vanadium, for alloying titanium hydride. The alloyed titanium hydride powder was manufactured, according to an embodiment of the invention, using a mixture of individual aluminum and niobium powders instead of the vanadium powder that was applied in Example 6. No halogens of alloying components were added. The following raw materials, chemicals, and gases were used:
titanium tetrachloride as a source of titanium,
metallic magnesium as a reducing agent,
hydrogen as a reactive shielding atmosphere and as a reducing agent,
titanium hydride powder $TiH_2$ as an additional source of titanium and as a source of atomic hydrogen,
individual aluminum and niobium powders at the weight ratio of 8:1 of aluminum powder to niobium powder. The amounts of these powders were calculated and experimentally adjusted to provide for the product composition of the Ti-16Al-2Nb alpha-titanium aluminide alloy.

All of the same process parameters were used to manufacture the titanium-aluminum-niobium hydride powder, as were used in Example 6. Cold compaction of the complex titanium-aluminum-niobium hydride powder was performed in a die using a mechanical press. The molding pressure was 50 tsi. The green density of the 4.8"×15.8"×54" pre-forms was at 70±15% of the theoretical amount. The pre-form was placed into the vacuum sintering furnace and was sintered at 1350° C., using a special, three-step sintering cycle. Firstly, heating was done to the initial dehydrogenation temperature of up to 425° C., using special furnace fixtures to remove the emitted hydrogen. This was followed by heating to temperatures where the complete removal of hydrogen took place at 700° C., holding at this temperature for the time equal to the thickness of the cross-section in inches multiplied by 30 minutes. Then, the compacted alloyed titanium hydride article was sintered at 1350±20° C. for 4 hours. All of the heating-cooling steps were carried out under argon, manufacturing oxygen-free, green articles before sintering.

The sintered titanium alloy Ti-16Al-2Nb article was cooled to the temperature of 1050° C. and was subjected to one-run of hot rolling, at the thickness reduction ratio of 4.5. The thickness of the titanium hot-rolled sheet was about 24 mm. The content of the impurities in the titanium alloy was the following: oxygen≤1400 ppm, iron<550 ppm, magnesium<10 ppm, chlorine<10 ppm, sodium<10 ppm, and hydrogen<50 ppm.

Example 8

The alloyed titanium hydride powder was manufactured, according to an embodiment of the invention, using a mixture of individual aluminum and vanadium powders at a lower ratio of aluminum-to-vanadium than that which was used in Example 6. No halogens of alloying components were added. The following raw materials, chemicals, and gases were used:
titanium tetrachloride as a source of titanium,
metallic magnesium as a reducing agent,
hydrogen as a reactive shielding atmosphere and as a reducing agent,
titanium hydride powder $TiH_2$ as an additional source of titanium and as a source of atomic hydrogen,
individual aluminum powder and vanadium powder at the ratio of 35 wt. % of the aluminum powder and 20 wt. % of the vanadium powder, based on the weight of the titanium. The amounts of these powders were calculated and experimentally adjusted to provide for the product composition of the Ti-3.5Al-2V alloy.

All of the process parameters were the same as those used in Example 6. Cold compaction of the complex titanium-aluminum-vanadium hydride powder was performed in a die using mechanical press. The molding pressure was 50 tsi. The green density of the 4.6"×15.8"×52.5" pre-forms was at 70±15% of the theoretical amount. The pre-form was placed into the vacuum sintering furnace and sintered at 1250° C., using a special, three-step sintering cycle. Firstly, heating was done to the initial dehydrogenation temperature of up to 450° C., using special furnace fixtures to remove the emitted hydrogen. This was followed by heating to temperatures where the complete removal of hydrogen tool place at 750° C., holding at this temperature for the time equal to the thickness of the cross-section in inches multiplied by 30 minutes. Then, the compacted titanium hydride article was sintered at 1250±20° C. for 4 hours. All of the heating-cooling steps were carried out under argon, manufacturing oxygen-free, green articles before sintering.

The as sintered samples were tensile tested and exhibited the following properties: ultimate tensile strength 110 ksi, yield strength 85 ksi, and elongation 18%.

Example 9

This Example demonstrates an embodiment of the invented method using the application of an alloying metal halogen other than the aluminum chloride or vanadium chloride that was applied in Example 2, particularly the use of chromium chloride and niobium chloride. The alloyed titanium hydride powder was manufactured, according to the invention, using the following raw materials, chemicals, and gases:
titanium tetrachloride as a source of titanium,
metallic magnesium as a reducing agent,
hydrogen as a reactive shielding atmosphere and as a reducing agent, titanium hydride powder TiH$_2$ as an additional source of titanium and as a source of atomic hydrogen, powder of aluminum chloride AlCl$_3$ as a source of aluminum, powder of chromium chloride NbCl$_5$ as a source of niobium, and powder of chromium chloride CrCl$_3$ as a source of chromium.

The amounts of the precursor salts TiCl$_4$, AlCl$_3$, CrCl$_3$, and NbCl$_5$ were calculated and experimentally adjusted to provide for the product composition of the low-oxygen alloy Ti-32Al-2.7Cr-4.8Nb gamma-titanium aluminide alloy.

All of the process parameters used to manufacture the titanium-aluminum-chromium-niobium hydride powder were the same as those that were used in Example 4.

Cold compaction of the complex titanium-aluminum-chromium-niobium hydride powder was performed in a die using mechanical press. The molding pressure was 50 tsi. The green density of the 4.6"×16.0"×52.5" pre-forms was at about 70±15% of the theoretical amount. The pre-form was placed into the vacuum sintering furnace and sintered at 1280° C., using a special, three-step sintering cycle. Firstly, heating was done to the initial dehydrogenation temperature of up to 375° C., using special furnace fixtures to remove the emitted hydrogen. This was followed by heating to the temperatures where the complete removal of hydrogen took place at 700° C., holding at this temperature for the time equal to the thickness of the cross-section in inches multiplied by 30 minutes. Then, the compacted titanium hydride article was sintered at 1280±20° C. for 4 hours. All of the heating-cooling steps were carried out under argon, manufacturing oxygen-free, green articles before sintering.

The sintered titanium alloy Ti-32Al-2.7Cr-4.8Nb article was cooled to the temperature of 1050° C. and was subjected to one-run of hot rolling at the thickness reduction ratio of 5. The thickness of the titanium hot-rolled sheet was about 22 mm. The content of impurities in the titanium alloy was the following: oxygen<1600 ppm, iron<600 ppm, magnesium<60 ppm, chlorine<150 ppm, sodium<10 ppm, and hydrogen<60 ppm.

Example 10

This Example demonstrates an embodiment of the invented method using only gaseous hydrogen and metal halogens for the alloying of the resulting titanium hydride powder. Additional TH$_2$ powder, together with titanium tetrachloride, as was supplied in Example 2 was not used. The alloyed titanium hydride powder was manufactured, according to an embodiment of the invention, using the following raw materials, chemicals, and gases:

titanium tetrachloride as a source of titanium, metallic magnesium as a reducing agent, hydrogen as a reactive shielding atmosphere and as a reducing agent, powder of aluminum chloride AlCl$_3$ as a source of aluminum, and liquid vanadium chloride VCl$_4$ as a source of vanadium. The amounts of the precursor salts TiCl$_4$, AlCl$_3$ and VCl$_4$ were calculated and experimentally adjusted to provide for the product composition of the Ti-6Al-4V alloy.

The process included the following steps:

(a) Metallic magnesium was melted and poured into the retort at 850° C., then hydrogen gas was supplied to the magnesium mirror. The system was held for 10 min, to allow for the dissolution of the hydrogen into the liquid magnesium up to saturation;

(b) Liquid titanium tetrachloride TiCl$_4$ was supplied from an inlet pipe into the retort filled with liquid magnesium, and the magnesium-thermic reaction was started, producing a metallic titanium sponge and magnesium chloride as a byproduct of this reaction;

(c) Aluminum chloride and vanadium chloride precursor salts were introduced into the retort, together with liquid titanium tetrachloride TiCl$_4$, in the form of a pulp;

(d) The reduction of the titanium tetrachloride TiCl$_4$, AlCl$_3$, and VCl$_4$ was carried out with liquid magnesium, and also by purging gaseous hydrogen through the liquid magnesium and magnesium chloride layers. The supplied hydrogen reacted with the titanium tetrachloride TiCl$_4$. This produced a solid phase of titanium trichloride TiCl$_3$, which when it contacted with liquid magnesium, was reduced to titanium both on the magnesium bath surface, and in the liquid magnesium, at the depth of 1-100 mm, or deeper. The aluminum- and vanadium chlorides were reduced to metallic aluminum and vanadium, which would be alloying elements in the sintering step;

(e) At the same time, hydrogen was dissolved into the reduced titanium, aluminum, and vanadium metals, at the end of the reduction reaction at 850° C., in an amount of up to 120 cm$^3$ of hydrogen per 1 g of titanium. This formed a sponge-like titanium-aluminum-vanadium hydride that contained both simple hydrides TiH$_{0.3}$, TiH$_{0.5}$, VH, and complex hydride compounds like (Ti, Al, V)H$_x$;

(f) After the titanium-aluminum-vanadium hydride sponge block was formed, it was subjected to vacuum separation at 1050±10° C. This emitted additional hydrogen from the titanium hydrides formed in the previous steps. This additional atomic hydrogen enhanced the removal of any residual magnesium and magnesium chloride from the sponge block's pores. Besides, the temperature of the sponge block decreased due to the heat of the evaporation of magnesium metal and magnesium chloride, because of the endothermic transformation TiH$_x$→Ti. This was accompanied by the homogenization of titanium hydride alloyed with aluminum and vanadium introduced earlier in the forms of metals and hydrides;

(g) Additional cold hydrogen was supplied into the retort, at a pressure of about 1 bar (1 atm), following the removal of a main part of magnesium and magnesium chloride, which was removed when the temperature in the center of the retort went down from 1050° C. to 600° C. Significant thermal stresses appeared in the sponge block due to its polymorphic transformation, the additional hydrogenation of titanium to TiH$_2$, and the crystallization of magnesium and magnesium chloride below the sponge block. These stresses broke the walls of the sponge block's pores, and previously closed pores opened up, improving conditions of vacuum separation;

(h) Once the sponge block had cooled, a full crystallization of metallic magnesium and magnesium chloride occurred, and additional stresses appeared within the titanium-aluminum-vanadium hydride sponge block, causing the partial disintegration of the sponge. This effect improved evaporation and eased the removal of magnesium and magnesium chloride during the second step of vacuum separation;

(i) The temperature of the metal hydride sponge block was again raised up to 1050° C. in the center of the retort, as in Example 1. When the temperature of the sponge block reached 1050° C., the hydrogen gas supply was stopped, and vacuum pumps were turned on to provide a vacuum in the retort, and to accomplish the second, final step of vacuum separation. Both the magnesium and magnesium chloride were completely removed from the titanium hydride sponge;

(j) Then, the sponge block was de-hydrogenated in the vacuum, at 1050° C., and the temperature spontaneously went down. When the temperature reached 600° C. and continued to go down, the process of de-hydrogenation was switched to hydrogenation, by supplying hydrogen gas again.

(k) After vacuum separation was completed, the sponge block was cooled to room temperature in the hydrogen atmosphere. This was carried out by permanently purging hydrogen through the retort. The cooling process was accompanied by the additional destruction of the sponge block's closed pores due to additional stresses initiated by the density differences between the liquid and solid phases, and (l) Using a rotary cutter, the cold titanium-aluminum-vanadium hydride sponge block was mechanically disintegrated immediately in the retort, under a protective argon atmosphere. The ratio of the cutter diameter $D_C$ to the inner diameter of the retort $D_R$ was about 0.94. The resulting particles of titanium-aluminum-vanadium hydride powder had a particle size in the range 70-600 microns. The content of hydrogen in the complex hydride powder was in the range of 2.0-2.5 wt. %, after hydrogenation during the process of cooling in a hydrogen atmosphere according to step (k).

The inner surface of the retort was covered by niobium sheets, which prevented the contamination of the resulting alloyed titanium hydride powder from the iron, nickel, and chromium of the retort material. The resulting alloyed titanium hydride powder was replaced from the retort by pneumatic transport, using argon, followed by packing the powder into drums without any contact with air.

Cold compaction of the complex titanium-aluminum-vanadium hydride powder was performed in a die using mechanical press. The molding pressure was 50 tsi. The green density of the 4.7"×15.9"×53.5" pre-forms was at 70±15% of the theoretical amount. The pre-form was placed into the vacuum sintering furnace and sintered at 1300° C., using a special, three-step sintering cycle. Firstly, heating was done to the initial dehydrogenation temperature of up to 400° C., using special furnace fixtures to remove the emitted hydrogen. This was followed by heating to temperatures where the complete removal of hydrogen took place 700° C., holding at this temperature for the time equal to the thickness of the cross-section in inches multiplied by 30 minutes. Then, the compacted titanium hydride article was sintered at 1300±20° C. for 4 hours. All of the heating-cooling steps were carried out under argon, manufacturing oxygen-free, green articles before sintering.

The sintered titanium alloy Ti-6Al-4V article was cooled to the temperature of 1150° C. and was subjected to one-run of hot rolling at the thickness reduction ratio of 6. The thickness of the titanium hot-rolled sheet was about 20 mm. The content of impurities in the titanium alloy was the following: oxygen≤1500 ppm, iron<600 ppm, magnesium<10 ppm, chlorine<10ppm, sodium<10 ppm, and hydrogen<50 ppm. The mechanical properties of this powder metallurgy (PM) Ti-6Al-4V alloy exhibited superior properties meeting and exceeding the properties of ingot metallurgy wrought products. The PM alloy exhibited 142 ksi of Ultimate Tensile Strength, 128 ksi of Yield Strength and 16% of Elongation.

Example 11

The alloyed titanium hydride powder was manufactured, according to an embodiment of the invention, using the following raw materials, chemicals, and gases. The raw materials did not comprise of either the halogens of the alloying components, or the additional $TH_2$ powder:

titanium tetrachloride as a source of titanium,
metallic magnesium as a reducing agent,
hydrogen as a reactive shielding atmosphere and as a reducing agent,
powder of aluminum-vanadium master alloy Al-40V, containing 60 wt. % of the aluminum and 40 wt. % of the vanadium. The amount of the master alloy was calculated and experimentally adjusted to provide for the product composition of the Ti-6Al-4V alloy.

The process included the following steps: (a) Metallic magnesium was melted and poured into the retort at 850° C., then hydrogen gas was supplied to the magnesium mirror. The system was held for 10 min, to allow for the dissolution of the hydrogen into the liquid magnesium up to saturation;

(b) Liquid titanium tetrachloride $TiCl_4$ was supplied from an inlet pipe into the retort filled with liquid magnesium, and the magnesium-thermic reaction was started, producing a metallic titanium sponge and magnesium chloride as a byproduct;

(c) Aluminum-vanadium master alloy powder was introduced into the retort, together with liquid titanium tetrachloride $TiCl_4$, in the form of a pulp;

(d) The reduction of the titanium tetrachloride $TiCl_4$ was carried out with liquid magnesium, but also by purging gaseous hydrogen through the liquid magnesium and magnesium chloride layers. The supplied hydrogen reacted with the titanium tetrachloride $TiCl_4$. This produced a solid phase of titanium trichloride $TiCl_3$, which when it contacted with the liquid magnesium, was reduced to titanium both on the magnesium bath surface, and in the liquid magnesium, at the depth of 1-100 mm, or deeper. The aluminum-vanadium master alloy started to dissolve in the reduced titanium;

(e) At the same time, hydrogen was dissolved into the reduced titanium, aluminum, and vanadium metals, at the end of the reduction reaction at 850° C., in an amount of up to 120 $cm^3$ of hydrogen per 1 g of titanium. This formed a sponge-like titanium-aluminum-vanadium hydride that contained both simple hydrides $TiH_{0.5}$, VH, and complex hydride compounds like $(Al, V)H_{x\ and\ (Ti, Al, V)Hx}$;

(f) After the titanium-aluminum-vanadium hydride sponge block was formed, it was subjected to vacuum separation at 1050±10° C., which emitted additional hydrogen from the titanium hydrides formed in the previous steps. This additional atomic hydrogen enhanced the removal of any residual magnesium and magnesium chloride from the sponge block's pores. In addition, the temperature of the sponge block decreased due to the heat of the evaporation of magnesium metal and magnesium chloride, and because of the endothermic transformation $TiH_x \rightarrow Ti$. This was accompanied by the homogenization of the titanium hydride alloyed with aluminum and vanadium introduced earlier in the forms of metals and hydrides;

(g) Additional cold hydrogen was supplied into the retort, at a pressure of about 1 bar (1 atm), following the removal of a main part of magnesium and magnesium chloride, which was removed when the temperature in the center of the retort went down from 1050° C. to 640° C. Significant thermal stresses appeared in the sponge block due to its polymorphic transformation, the [and] additional hydrogenation of titanium to $TiH_2$, and the crystallization of magnesium and magnesium chloride below the sponge block. These stresses broke the walls of the sponge block's pores, and previously closed pores opened up, improving conditions of vacuum separation;

(h) Once the sponge block had cooled, a full crystallization of metallic magnesium and magnesium chloride occurred, and additional stresses appeared within the titanium-aluminum-vanadium hydride sponge block, causing the partial disintegration of the sponge. This effect improved evaporation and eased the removal of magnesium and magnesium chloride during the second step of vacuum separation;

(i) The temperature of the metal hydride sponge block was again raised up to 1050° C. in the center of the retort, as in Example 1. When the temperature of the sponge block reached 1050° C., the hydrogen gas supply was stopped, and vacuum pumps were turned on to provide a vacuum in the retort, and to accomplish the second, final step of vacuum separation. Both the magnesium and magnesium chloride were completely removed from the titanium hydride sponge;

(j) Then, the sponge block was de-hydrogenated in the vacuum, at 1050° C., and the temperature spontaneously went down. When the temperature reached 600° C. and continued to go down, the process of de-hydrogenation was switched to hydrogenation, by supplying hydrogen gas again.

(k) After vacuum separation was completed, the sponge block was cooled to room temperature in the hydrogen atmosphere. This was carried out by permanently purging hydrogen through the retort. The cooling process was accompanied by the additional destruction of the sponge block's closed pores due to additional stresses initiated by the density differences between the liquid and solid phases, and (l) Using a rotary cutter, the cold titanium-aluminum-vanadium hydride sponge block was mechanically disintegrated immediately into the retort, under a protective argon atmosphere.

The ratio of the cutter diameter $D_C$ to the inner diameter of the retort $D_R$ was about 0.92. The resulting particles of titanium-aluminum-vanadium hydride powder had a particle size in the range 70-600 microns. The content of hydrogen in the complex hydride powder was in the range of 2.5-3.0 wt. %, after hydrogenation during the process of cooling in a hydrogen atmosphere according to step (k).

The inner surface of the retort was covered by niobium sheets, which prevent the contamination of the resulting alloyed titanium hydride powder from the iron, nickel, and chromium of the retort material. The resulting alloyed titanium hydride powder was removed from the retort by pneumatic transport, using argon, followed by packing the powder into drums without any contact with air.

Cold compaction of the complex titanium-aluminum-vanadium hydride powder was performed in a die using mechanical press. The molding pressure was 50 tsi. The green density of the 4.7"×15.9"×53.5" pre-forms was at 70±15% of the theoretical amount. The pre-form was placed into the vacuum sintering furnace and sintered at 1250° C., using a special, three-step sintering cycle. Firstly, heating was done to the initial dehydrogenation temperature of up to 375° C., using special furnace fixtures to remove the emitted hydrogen. Followed by, heating to temperatures where the complete removal of hydrogen took place at 700° C., holding at this temperature for the time equal to the thickness of the cross-section in inches multiplied by 30 minutes. Then, the compacted titanium hydride article was sintered at 1250±20° C. for 4 hours. All of the heating-cooling steps were carried out under argon, manufacturing oxygen-free, green articles before sintering.

The as sintered samples were tensile tested and exhibited the following properties: Ultimate Tensile Strength 139 ksi, Yield Strength 112 ksi, and Elongation 17%.

Example 12

The alloyed titanium hydride powder was manufactured, according to the invention, using the following raw materials, chemicals, and gases. As with Example 11, the raw materials, however, did not comprise of either the halogens of the alloying components or of the additional $TH_2$ powder. But individual alloying powders were used instead of the master alloy:

titanium tetrachloride as a source of titanium,
metallic magnesium as a reducing agent,
hydrogen as a reactive shielding atmosphere and as a reducing agent,
individual aluminum powder and vanadium powder at the ratio of 60 wt. % of the aluminum powder and 40 wt. % of the vanadium powder. The amounts of these powders were calculated and experimentally adjusted to provide for the product composition of the Ti-6Al-4V alloy.

All of the process parameters used to manufacture the titanium-aluminum-vanadium hydride powder were the same as those used in Example 11.

Cold compaction of the complex titanium-aluminum-vanadium hydride powder was performed in a die using mechanical press. The molding pressure was 50 tsi. The green density of the 4.5"×15.6"×52.8" pre-forms was at 70±15% of the theoretical amount. The pre-form was placed into the vacuum sintering furnace and sintered at 1300° C., using a special, three-step sintering cycle. Firstly, heating was done to the initial dehydrogenation temperature of up to 450° C., using special furnace fixtures to remove the emitted hydrogen. This was followed by heating to temperatures where the complete removal of hydrogen took place at 700° C., holding at this temperature for the time equal to the thickness of the cross-section in inches multiplied by 30 minutes. Then, the compacted titanium hydride article was sintered at 1300±20° C. for 4 hours. All of heating-cooling steps were carried out under argon, manufacturing oxygen-free, green articles before sintering.

The as sintered samples were tensile tested and exhibited the following properties: Ultimate
Tensile Strength 135 ksi, Yield Strength 125 ksi, and Elongation 10%.

The sintered titanium alloy Ti-6Al-4V article was cooled to the temperature of 1050° C. and was subjected to one-run of hot rolling at the thickness reduction ratio of 6. The thickness of the titanium hot-rolled sheet was about 20 mm. The content of impurities in the titanium alloy was the following: oxygen≤1600 ppm, iron<550 ppm, magnesium<10 ppm, chlorine<10 ppm, sodium<10 ppm, and hydrogen<50 ppm. The mechanical properties of this powder metallurgy (PM) Ti-6Al-4V alloy exhibited superior properties, meeting and exceeding the properties of ingot metallurgy wrought products. The PM alloy exhibited 144 ksi of Ultimate Tensile Strength, 126 ksi of Yield Strength and 16% of Elongation.

We claim:

1. A method of manufacturing pure and alloyed titanium hydride powders by the combined hydrogen-magnesium reduction of metal halides, comprising:

(a) filling a reaction retort with liquid metallic magnesium or with solid metallic magnesium and melting the solid magnesium, supplying hydrogen into the retort at 750-850° C., and dissolving the hydrogen into the liquid magnesium up to saturation, (b) supplying liquid titanium tetrachloride $TiCl_4$ into the retort filled with liquid magnesium thereby producing titanium by reducing the titanium tetrachloride, and forming magnesium chloride as a byproduct, (c) introducing gaseous hydrogen and at least one component from the group consisting of titanium hydride powder, metal halides, individual metal powders, metal hydride powders other than titanium hydride powder, master alloy powders, or combinations thereof, together with liquid titanium tetrachloride TiCl$_4$, in the form of a pulp into the retort, whereby the amount of any titanium hydride powder is in the range of 0.1-10 wt. % of the total amount of titanium product to be produced from the titanium tetrachloride for a single processing cycle, (d) dissociating any titanium hydride into titanium and hydrogen al 750-850° C., followed by forming hydrogen gas micro-bubbles, which bubble in both the liquid phases of magnesium and magnesium chloride, thereby increasing the rate of the reduction by increasing an effective surface area of reacting phases, destroying a magnesium chloride film on the surface of the molten magnesium, and generating a turbulent gas phase above the liquid in the retort, (e) dissolving hydrogen into the reduced titanium metal to the end of reduction reaction at 750-850° C., in an amount of 30-180 cm$^3$ of hydrogen per 1 g of titanium and forming a block of sponge-like titanium hydride, having a composition of TiH$_x$, where x is in the range of 0.3-1, (f) vacuum separating the block of sponge-like titanium hydride at 1000-1050° C., homogenizing alloyed titanium hydride, and emitting additional hydrogen from the titanium hydride, thereby destroying closed pores of the block of sponge-like titanium hydride due to density differences of the titanium hydrides having varying hydrogen content, thereby effectively liberating and removing residual magnesium and magnesium chloride, (g) supplying additional cold hydrogen into the retort after the removal of a part of the magnesium and magnesium chloride, decreasing the temperature in the center of the retort to 600-640° C., thereby effecting a polymorphic transformation, additional hydrogenation of the block of sponge-like titanium hydride, and cooling of the retort from the outside, (h) at least partially crystallizing the metallic magnesium and magnesium chloride, resulting in additional stresses to the block of sponge-like titanium hydride, thereby resulting in at least a partial disintegration of the block of sponge-like titanium hydride, and providing for evaporation and the removal of magnesium and magnesium chloride during a subsequent step of vacuum separation, (i) raising the temperature of the block of sponge-like titanium hydride in the center of the retort to 1000-1050° C., by supplying hydrogen, (j) de-hydrogenating the block of sponge-like titanium hydride in a vacuum at 1000-1050° C., followed by hydrogenation at temperatures in the range of 600-640° C. to promote a destruction of the pores of the sponge-like titanium hydride due to changes in the lattice structures and bulk densities of the compositions formed in the sponge-like titanium hydride block due to phase transformation at different temperatures, (k) removing the magnesium chloride and the metallic magnesium from the block of sponge-like titanium hydride by vacuum separation, (l) cooling the block of sponge-like titanium hydride to room temperature and hydrogenating in a hydrogen atmosphere by purging hydrogen through the retort thereby increasing the brittleness of the block of sponge-like titanium hydride, while saving energy needed for disintegration of the block of sponge-like titanium hydride in the retort, and (m) mechanically disintegrating the block of sponge-like titanium hydride inside the retort after hydrogenation according to step (l), whereby the disintegration is carried out in an atmosphere selected from the group consisting of hydrogen, inert gas, and vacuum.

2. The method according to claim 1, wherein at least one metal halide according to the general formula MeHl$_x$ where Me is a metal selected from the group consisting of Ti, V, Al, Mo, Cr, Nb, Zr, Fe, Pd, Ru, Ni, W, Ta, Sn, Co, and Hl is selected from the group consisting of Cl, F, Br, and I is introduced into the retort simultaneously with any titanium hydride powder.

3. The method according to claim 2, wherein metal halides in the solid, liquid, and gaseous form are supplied simultaneously into the retort to the surface of the liquid magnesium, thereby starting reduction reaction producing titanium.

4. The method according to claim 1, wherein at least one metal hydride selected from the group consisting of vanadium hydride, chromium hydride, zirconium hydride, and molybdenum hydride is introduced into the retort simultaneously with any titanium hydride powder.

5. The method according to claim 1, wherein the gaseous hydrogen is introduced into the retort simultaneously with any titanium hydride powder, and optionally metal halides, individual metal powders, and master alloy powders.

6. The method according to claim 1, wherein the gaseous hydrogen is introduced into the retort before the introduction of any titanium hydride powder, metal halides, individual metal powders, and master alloy powders.

7. The method according to claim 1, wherein the gaseous hydrogen is introduced into the retort after the introduction of any titanium hydride powder, and optionally metal halides, individual metal powders, and master alloy powders.

8. The method according to claim 1, further comprising adding alloying components into the retort in a form selected from the group consisting of a solid powder of individual metals, a solid powder of master alloys, a solid powder of metal hydrides, metal halides, and combinations thereof.

9. The method according to claim 1, wherein the inner surface of the retort is covered by sheets or foils of a metal selected from a group consisting of niobium, molybdenum, tantalum, and alloys thereof.

10. The method according to claim 1, further comprising grinding the obtained titanium hydride powder inside the retort to a selected particle size using mechanical crushing, removing the resulting ground powder from the retort by pneumatic transport using argon, and packing the resulting ground powder into drums without any contact with air.

11. The method according to claim 1, further comprising cold compacting the titanium hydride powder under argon to manufacture an oxygen-free green article.

12. The method according to claim 11, further comprising placing the green article under argon protection into a capsule filled with hydrogen or argon or outgassed to vacuum, placing the capsule into a furnace, and sintering the green articles at 1200-1300° C. to form titanium or titanium alloy articles.

13. The method according to claim 12, further comprising cooling the sintered titanium or tianium alloy articles to room temperature and subjecting the sintered titanium or titanium alloy articles to at least one high temperature deformation process selected from the group consisting of forging, rolling, extrusion, and flow forming.

14. The method according to claim 12, further comprising cooling the sintered titanium or titanium alloy articles to temperatures in the range of 750-1150° C. and subjecting the sintered titanium or titanium alloy articles to multi-runs of hot rolling, forging, or pressing.

15. The method according to claim 12 further comprising subjecting the sintered titanium or titanium alloy articles to multi-runs of hot rolling, forging, or pressing immediately after sintering, without cooling.

16. The method according to claim 12, further comprising cooling the sintered titanium or titanium alloy articles to room temperature and subjecting the sintered titanium or titanium alloy articles to at least one deformation process selected from the group consisting of forging, rolling, extrusion, and flow forming.

17. The method according to claim 1, further comprising cold compacting a mixture of the titanium hydride powder with other metal hydrides, which were produced together with the said titanium hydride in the same retort, under argon to manufacture an oxygen-free green titanium alloy article.

18. The method according to claim 17, wherein the green articles are placed under argon protection into a capsule filled with hydrogen or argon or outgassed to vacuum, and the capsule is placed into a furnace, where the green articles are sintered at 1200-1300° C. to form titanium or titanium alloy articles.

19. The method according to claim 1, wherein step (a) comprises introducing solid metallic magnesium into the retort, melting the magnesium in the retort to form liquid magnesium, and supplying hydrogen into the retort at 750-850° C., followed by the dissolution of hydrogen into the liquid magnesium up to saturation.

20. The method according to claim 17, further comprising sintering the green articles comprising:
    heating to an initial dehydrogenation temperature of up to 350-450° C., using furnace fixtures configured to remove emitted hydrogen,
    heating to a temperature of 650-750° C. where the complete removal of hydrogen takes place, holding at this temperature for a time equal to a cross-sectional thickness of the article in inches multiplied by 30 minutes, and
    subsequent sintering at 1200-1300° C.

21. The method according to claim 1, further comprising chemical reaction, hydrogenation, or dehydrogenation of the pure or alloyed titanium hydride powders at temperatures 50-250° C. below that of equilibrium, thereby slowing diffusion exchange between the retort material and the titanium hydride powders and diminishing contamination of the powders.

22. The method according to claim 1, further comprising introducing a powder of titanium dioxide $TiO_2$ into the retort in an amount ranging from 0.01 wt. % to 10 wt. % based on the total weight of the retort charge, thereby controlling the content of oxygen dissolved into the titanium hydride particles, whereby in doing so, an oxide layer on the surface of titanium hydride particles is removed by atomic hydrogen that is emitted during the dehydration of the titanium hydride.

23. The method according to claim 1, wherein the manufacturing process is continuous and comprises:
    (a) supplying liquid magnesium in an inclined tube, whereby the liquid magnesium partially fills the tube profile and glides upon gravitation and rotation of the tube,
    (b) supplying titanium tetrachloride, titanium hydride powder, master alloys, and hydrogen in a space between the liquid magnesium and a wall of the tube, forming a pulp of all these components which takes the whole volume of the tube,
    (c) supplying said pulp into a tall intermediate retort, which is permanently outgassed by vacuum pumps,
    (d) vaporizing and condensing magnesium and magnesium chloride in an outside condenser,
    (e) hydrogen in the intermediate retort through a screw-equipped outlet pipe,
    (f) forming solid titanium hydride in a bottom zone of the retort, where magnesium and magnesium chloride are fully evacuated,
    (g) permanently mixing titanium hydride mass by a screw tooling located at the bottom of the retort, thereby preventing sintering of titanium hydride at a temperature of 900-950° C.,
    (h) saturating titanium hydride by supplying a countercurrent flow of cold hydrogen gas in the screw-equipped outlet pipe, which transports titanium hydride out of the retort, wherein the cold hydrogen gas is supplied in an amount that provides a temperature of 600-650° C., at the entrance of the retort from the outlet pipe, and at a temperature below the boiling temperature of magnesium chloride at the grade of vacuum the retort,
    (i) cooling produced titanium hydride by cold hydrogen at the exit of the outlet pipe to a temperature of 120-150° C. and
    (j) packing cold titanium hydride powder into metal drums in the presence of argon without contacting said poder with air, whereby the argon expels hydrogen from the packed powder.

24. The method according to claim 1, wherein the manufacturing process is semi-continuous and comprises moving a lid-free retort sequentially along several stands, wherein each stand is designated for a single technological operation, wherein transportation of a car with the retort from one stand to another is carried out in a pusher-type furnace filled with argon under pressure, and wherein the stands are separated one from another by an insulating partition, comprising:
    (a) drying and inspecting the retort at a first stand,
    (b) filling the retort with liquid magnesium at a second stand,
    (c) filling the retort with hydrogen that dissolves in magnesium at a third stand,
    (d) supplying liquid titanium tetrachloride into the retort together with halogens of alloying metals, master alloy powders, individual metal powders at a fourth stand,
    (e) vacuum separating, in a first vacuum separation step, at a fifth stand,
    (f) hydrogenating titanium, in a first hydrogenation step, at a sixth stand,
    (g) vacuum separating, in a second vacuum separation step, at a seventh stand,
    (h) hydrogenating titanium, in a second hydrogenation step, at an eighth stand,
    (i) disintegrating the resulting titanium hydride product in the retort at a ninth stand, and pneumatically removing the titanium hydride from the retort, and
    (j) cleaning the retort of process residues at a tenth stand.

* * * * *